US012192259B2

(12) United States Patent
Van Wie et al.

(10) Patent No.: US 12,192,259 B2
(45) Date of Patent: *Jan. 7, 2025

(54) BRIDGING PHYSICAL AND VIRTUAL SPACES

(71) Applicant: Sococo, Inc., Austin, TX (US)

(72) Inventors: David Van Wie, Eugene, OR (US); Paul J. Brody, Palo Alto, CA (US); Joseph W. Jennings, Larkspur, CA (US)

(73) Assignee: SOCOCO, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,099

(22) Filed: Apr. 5, 2023

(65) Prior Publication Data

US 2023/0306484 A1    Sep. 28, 2023

Related U.S. Application Data

(63) Continuation of application No. 15/066,755, filed on Mar. 10, 2016, now Pat. No. 11,657,438, which is a
(Continued)

(51) Int. Cl.
| | | |
|---|---|---|
| H04L 65/403 | (2022.01) | |
| G06F 3/01 | (2006.01) | |
| G06F 3/04812 | (2022.01) | |
| G06F 3/04815 | (2022.01) | |
| G06F 3/0484 | (2022.01) | |
| G06Q 30/0601 | (2023.01) | |
| H04L 12/18 | (2006.01) | |
| H04L 67/30 | (2022.01) | |
| H04L 67/54 | (2022.01) | |
| H04M 3/56 | (2006.01) | |

(Continued)

(52) U.S. Cl.
CPC .......... *H04L 65/403* (2013.01); *G06F 3/011* (2013.01); *G06F 3/04812* (2013.01); *G06F 3/04815* (2013.01); *G06F 3/0484* (2013.01); *G06Q 30/0613* (2013.01); *H04L 12/1813* (2013.01); *H04L 12/1822* (2013.01); *H04L 12/1827* (2013.01); *H04L 67/30* (2013.01); *H04L 67/54* (2022.05); *H04N 7/157* (2013.01); *H04W 4/21* (2018.02); *H04W 4/50* (2018.02); *H04M 3/567* (2013.01); *H04M 2242/30* (2013.01)

(58) Field of Classification Search
None
See application file for complete search history.

(56) References Cited

U.S. PATENT DOCUMENTS

| | | | | |
|---|---|---|---|---|
| 2007/0233785 A1* | 10/2007 | Abraham | ............. | G06Q 10/107 709/204 |
| 2010/0162121 A1* | 6/2010 | Yoakum | .................. | A63F 13/87 715/727 |

(Continued)

OTHER PUBLICATIONS

Notice of Allowability mailed Jan. 9, 2023, filed in U.S. Appl. No. 15/066,755, pp. 1-4.

(Continued)

*Primary Examiner* — Schquita D Goodwin
*Assistant Examiner* — Jonathan A Sparks

(57) ABSTRACT

Examples of systems and methods for bridging virtual and physical spaces are described. In some of these examples, a particular communicant's real world state drives changes in one or more of the communications connections, virtual state, and communications interface of the particular communicant or another communicant.

18 Claims, 20 Drawing Sheets

Related U.S. Application Data continuation of application No. 14/056,192, filed on Oct. 17, 2013, now Pat. No. 9,288,242, and a continuation-in-part of application No. 14/056,226, filed on Oct. 17, 2013, now Pat. No. 10,356,136.

(60) Provisional application No. 61/716,316, filed on Oct. 19, 2012.

(51) Int. Cl.
  *H04N 7/15* (2006.01)
  *H04W 4/21* (2018.01)
  *H04W 4/50* (2018.01)

(56) References Cited

U.S. PATENT DOCUMENTS

| | | | |
|---|---|---|---|
| 2010/0229106 A1* | 9/2010 | Lee | H04L 67/131 |
| | | | 715/757 |
| 2012/0066035 A1* | 3/2012 | Stanger | G01S 5/02521 |
| | | | 705/14.1 |

OTHER PUBLICATIONS

Response to Non-Final Office Action dated Nov. 18, 2022, filed in U.S. Appl. No. 15/066,755, pp. 1-12.
Non-Final Office Action mailed Jul. 18, 2022, filed in U.S. Appl. No. 15/066,755, pp. 1-21.
Request for Continued Examination dated Jun. 23, 2022, filed in U.S. Appl. No. 15/066,755, pp. 1-15.
Final Office Action mailed Dec. 23, 2021, filed in U.S. Appl. No. 15/066,755, pp. 1-21.
Request for Continued Examination dated Dec. 2, 2021, filed in U.S. Appl. No. 15/066,755, pp. 1-15.
Response to Non-Final Office Action dated May 3, 2021, filed in U.S. Appl. No. 15/066,755, pp. 1-11.
Non-Final Office Action mailed Nov. 3, 2020, filed in U.S. Appl. No. 15/066,755, pp. 1-19.
Request for Continued Examination dated Oct. 7, 2020, filed in U.S. Appl. No. 15/066,755, pp. 1-11.
Final Office Action mailed Apr. 7, 2020, filed in U.S. Appl. No. 15/066,755, pp. 1-20.
Response to Non-Final Office Action dated Dec. 23, 2019, filed in U.S. Appl. No. 15/066,755, pp. 1-12.
Non-Final Office Action mailed Jun. 21, 2019, filed in U.S. Appl. No. 15/066,755, pp. 1-28.
Supplemental Amendment dated Jun. 7, 2019, filed in U.S. Appl. No. 15/066,755, pp. 1-8.
Request for Continued Examination dated Apr. 10, 2019, filed in U.S. Appl. No. 15/066,755, pp. 1-24.
Response to Non-Final Office Action dated May 21, 2018, filed in U.S. Appl. No. 15/066,755, pp. 1-18.
Non-Final Office Action mailed Mar. 12, 2018, filed in U.S. Appl. No. 15/066,755, pp. 1-22.

\* cited by examiner

BRIDGING PHYSICAL AND VIRTUAL SPACES

CROSS-REFERENCE TO RELATED APPLICATIONS

Under 35 U.S.C. § 119(e), this application claims the benefit of U.S. Provisional Application No. 61/716,316, filed Oct. 19, 2012, the entirety of which is incorporated herein by reference.

This application also relates to the following co-pending patent applications, the entirety of each of which is incorporated herein by reference: U.S. patent application Ser. No. 13/409,344, filed Mar. 1, 2012; U.S. patent application Ser. No. 13/229,349, filed Sep. 9, 2011; U.S. patent application Ser. No. 13/229,395, filed Sep. 9, 2011; U.S. patent application Ser. No. 13/209,812, filed Aug. 15, 2011; U.S. patent application Ser. No. 12/825,512, filed Jun. 29, 2010; U.S. patent application Ser. No. 12/694,126, filed Jan. 26, 2010; U.S. patent application Ser. No. 12/509,658, filed Jul. 27, 2009; U.S. application Ser. No. 12/418,243, filed Apr. 3, 2009; U.S. patent application Ser. No. 12/418,270, filed Apr. 3, 2009; U.S. patent application Ser. No. 12/354,709, filed Jan. 15, 2009; U.S. application Ser. No. 12/630,973, filed on Dec. 4, 2009; U.S. patent application Ser. No. 12/818,517, filed Jun. 18, 2010; U.S. patent application Ser. No. 12/855,210, filed Aug. 12, 2010; U.S. patent application Ser. No. 13/554,051, filed Jul. 20, 2012; U.S. patent application Ser. No. 13/554,084, filed Jul. 20, 2012; and U.S. Provisional Patent Application No. 61/563,088, filed Nov. 23, 2011.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

DETAILED DESCRIPTION

Figure 1:
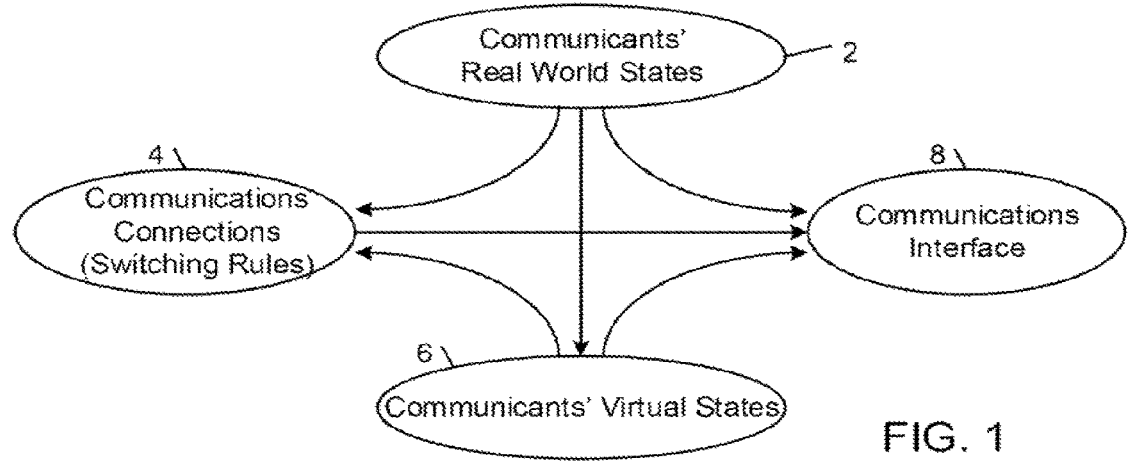
FIG. 1 is a diagrammatic view of examples of relationships between virtual and real world states of a communicant on the communications connections with the communicant and the communications interface presented to the communicant.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" (also referred to as "memory") refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

Synchronous conferencing refers to communications in which communicants participate at the same time. Synchronous conferencing encompasses all types of networked collaboration technologies, including instant messaging (e.g., text chat), audio conferencing, video conferencing, application sharing, and file sharing technologies.

A "communicant interaction" is any type of direct or indirect action or influence between a communicant and another network entity, which may include for example another communicant, a virtual area, or a network service. Examples of types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "physical space" is a three-dimensional real world environment in which a communicant can be located physically.

A "virtual area" (also referred to as an "area" or a "place") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "persistent virtual area" is a virtual area that persists even after all communicants have disconnected from the virtual area. The state of a persistent virtual area is preserved so that it can be restored the next time a communicant connects to the virtual area. A "persistent association" between a virtual area and virtual presence apparatus is an association that persists even after all communicants and the virtual presence apparatus have disconnected from the virtual area.

A "virtual area application" (also referred to as a "virtual area specification") is a description of a virtual area that is used in creating a virtual environment. A virtual area application typically includes definitions of geometry, physics, and realtime switching rules that are associated with one or more zones of the virtual area.

A "virtual area enabled communications application" is a client communications application that integrates realtime communications (e.g., synchronous conferencing functionalities, such as audio, video, chat, and realtime other data communications) with a virtual area.

A "virtual environment" is a representation of a computer-managed space that includes at least one virtual area and supports realtime communications between communicants.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

VoIP (Voice over Internet Protocol) refers to systems and methods of delivering voice and other communications over Internet Protocol (IP) networks.

As used herein, the term "includes" means includes but not limited to, the term "including" means including but not limited to. The term "based on" means based at least in part on.

II. Bridging Virtual and Physical Spaces

The embodiments that are described herein provide systems and methods of bridging virtual and physical spaces.

Referring to FIG. 1, in some examples, communicants' real world and virtual states 2, 6 are separate layers of experience that drive communications connections 4 between communicants, and communications interfaces 8 for visualizing those layers of experience. In these examples, a particular communicant's real world state 2 drives changes in one or more of the communications connections 4, virtual state 6, and communications interface 8 of the particular communicant or another communicant. For example, a particular communicant's real world (absolute or relative) location may drive changes in the virtual state (e.g., real world location based switching of the communicant's virtual location), communications connections (e.g., real world location based switching between communications devices), and communications interface (e.g., representing real world location and presence in a graphical communications interface) of the particular communicant or another communicant. In the illustrated example, a particular communicant's virtual state 6 also drives changes in the communications connections 4 between communicants, and communications interfaces 8 for visualizing real world and virtual states of communicants. For example, a particular communicant's virtual location also may drive changes in one or more of the communications connections 4 (e.g., switching communications connections based on virtual location) and communications interface 8 (e.g., representing virtual location and presence in a graphical communications interface) of the particular communicant or another communicant.

Figure 2:
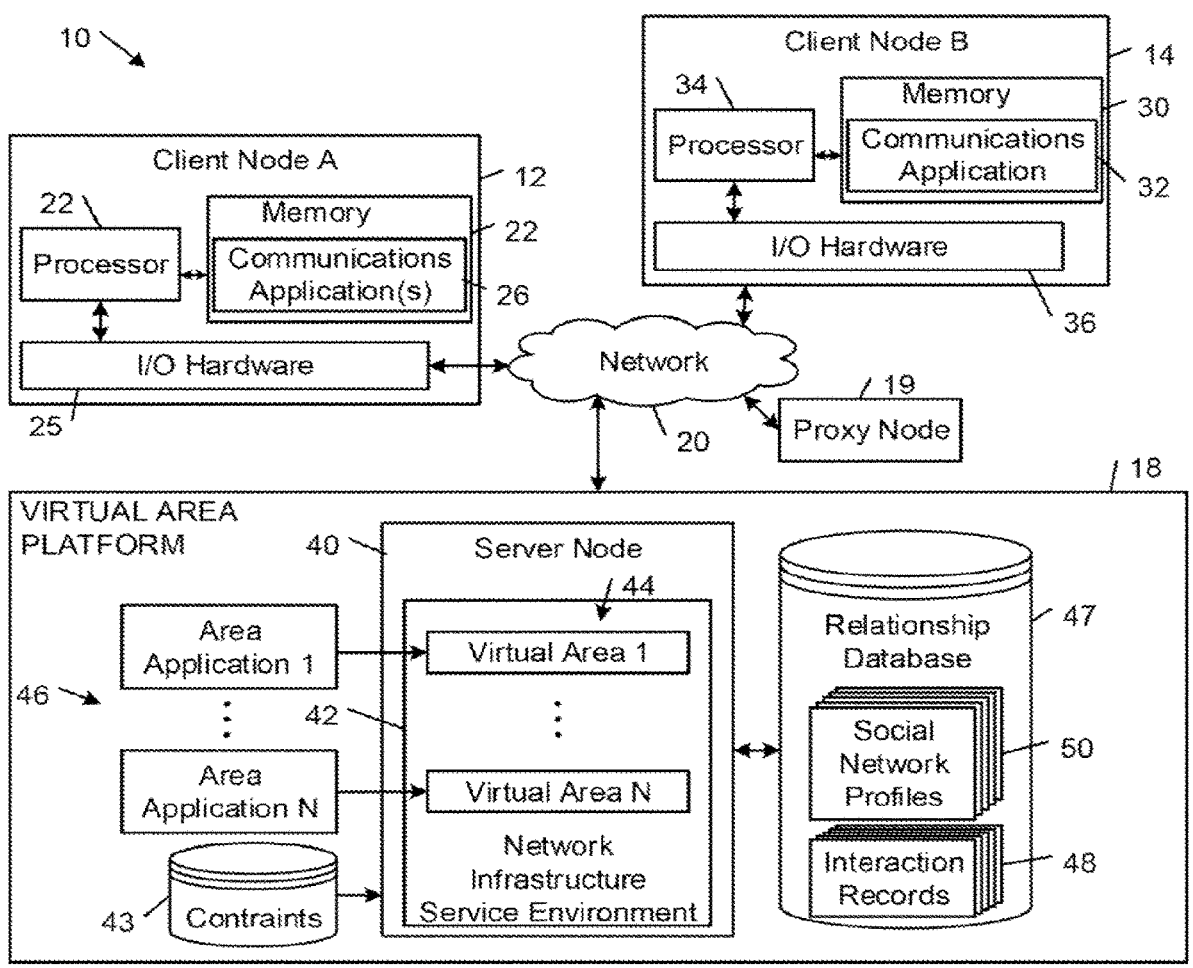
FIG. 2 is a diagrammatic view of an example of a network communications environment.

FIG. 2 shows an example of a network communications environment 10 that includes an example of a first client network node 12 (Client Node A), an example of a second client network node 14 (Client Network Node B), an example 18 of the virtual area platform 2, and an optional proxy network node 19 that are interconnected by a network 20, which may include one or more of a local area network (LAN), a metropolitan area network (MAN), and a wide area network (WAN) (e.g., the internet).

The first client network node 12 includes a computer-readable medium 22 (or "memory"), a processor 24, and input/output (I/O) hardware 25 (including, e.g., a display and network communication hardware). The processor 24 executes at least one virtual area enabled communications application 26 that is stored in the memory 22. The second client network node 14 typically is configured in substantially the same way as the first client network node 12, with a computer-readable medium 30 storing at least one virtual area enabled communications application 32, a processor 34, and I/O hardware 36.

Each of the client network nodes 12, 14 has a respective set of one or more sources and an exemplary set of one or more sinks. Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display). Each of the client network nodes 12, 14 also typically includes administrative policies, user preferences (including preferences regarding the exportation of the user's presence and the connection of the user to the virtual area platform 18 and other communicants), and other settings that define a local configuration that influences the administration of realtime connections with the virtual presence apparatus 12, the virtual area platform 18, and other network nodes.

The virtual area platform 18 includes at least one server network node 40 that provides a network infrastructure service environment 42 that manages sessions of the first and second client nodes 12, 14 in one or more virtual areas 44 in accordance with respective virtual area applications 46. One or more of the virtual area applications 44 typically are synchronous conferencing applications that support one or more types of communications between the client nodes 12, 14 (e.g., text chat, audio conferencing, video conferencing, application sharing, and file sharing). The network infrastructure service environment 42 typically includes one or more network infrastructure services that cooperate with the communications applications 26, 32 in the process of establishing and administering network connections between the client nodes 12, 14 and other network nodes. Among the network infrastructure services that are included in the example of the network infrastructure service environment 42 are an account service, a security service, an area service, a rendezvous service, an interaction service, and a capabilities engine. The area service administers a virtual area 44 by managing sessions of the first and second client nodes 12, 14 in the virtual area 44 in accordance with the virtual area application 46. Examples of the virtual area platform 18 and the virtual area applications 46 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The network infrastructure service environment 42 maintains a relationship database 47 that contains records 48 of interactions between communicants, and social network profiles 50 that are associated with respective communicants. Each interaction record describes the context of an interaction between a pair of communicants. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10. Additional details regarding the relationship database 47 and the search and retrieval functionalities associated with the relationship database as described in U.S. patent application Ser. No. 12/354,709, filed Jan. 15, 2009, U.S. patent application Ser. No. 12/418,243, filed Apr. 3, 2009, U.S. patent application Ser. No. 12/631,026, filed Dec. 4, 2009, and U.S. patent application Ser. No. 13/432,837, filed Mar. 28, 2012.

The virtual area enabled communications applications 26, 32, the area applications 46, and the network infrastructure service environment 42 together provide a platform that administers the realtime connections with network nodes in an instance of a virtual area subject to a set of constraints 43 (e.g., capabilities and other types of permissions, rules, and preferences). Each of the virtual area applications 46 is hosted by a respective one of the virtual areas 44 and includes a description of the respective virtual area 44. Communicants respectively operating the client nodes 12, 14 connect to the virtual areas 44 through the virtual area enabled communications applications 26, 32.

The virtual area enabled communications applications 26, 32 typically present respective views of the virtual areas 44 in accordance with data received from the network infrastructure service environment 42. The virtual area enabled communications applications 26, 32 also provide respective interfaces (e.g., one or more of a voice input interface, and audio output interface, and a visual graphical user interface) for receiving commands from the communicants. In visual graphical user interfaces, communicants typically are represented in the virtual areas 44 by respective avatars (e.g., sprites). In audio output interfaces, communicants' states and activities are described using audio signals (e.g., synthesized speech). Communicant avatars typically move about the virtual areas 44 in response to commands that are input by the communicants at their respective network nodes. In some examples, the virtual area enabled communications applications 26, 32 establish realtime data stream connections between the first and second client network nodes 12, 14 and other network nodes connected to the virtual area 44 based on the positions of the communicants' avatars in the virtual areas 44. In some examples, each of the client network nodes 12, 14 includes a respective realtime kernel of the type described in U.S. patent application Ser. No. 12/630,973, filed Dec. 4, 2009, which supports remote configuration of stream handlers for processing data streams (e.g., rendering audio and video data streams) on a client network node.

A virtual area 44 may correspond to a visual virtual area of the type disclosed in U.S. Pat. Nos. 7,769,806 and 7,844,724 that is defined with respect to one-, two- or three-dimensional geometric coordinates, or an abstract (non-geometric) virtual area of the type described in U.S. application Ser. No. 12/631,008, which was filed on Dec. 4, 2009, that is defined with respect to abstract coordinates. Visual virtual areas are associated with respective visualizations, whereas abstract virtual areas may or may not be associated with respective visualizations.

A virtual area typically includes one or more zones. A zone may be a rendered spatial extent, a set of rules applied to a spatial extent, or both. Zones may be arranged hierarchically in a virtual area, with an outermost zone (referred to herein as the "global governance zone") enclosing all other zones in the virtual area. Within the global governance zone, there can be location zones (e.g., rooms of a virtual area) or smaller governance zones that enclose a group of location zones and provide regions of governance on the map. A zone definition typically also includes one or more channel definitions that describe how to create respective channels in the zone and specify the information about the channel that is published to a client network node that becomes present in the zone. A channel is always uniquely defined point-to-point and is unique to a virtual area application and a session between a client network node and the virtual area platform.

Examples of the types of rules that may be associated with a zone include switching rules, governance rules, and permission rules.

Switching rules govern realtime stream connections between network nodes that are linked to the virtual area (e.g., network nodes that are associated with objects, such as avatars, in the virtual area). The switching rules typically include a description of conditions for connecting sources and sinks of realtime data streams in terms of positions in the virtual area. Each switching rule typically includes attributes that define the realtime data stream type to which the rule applies and the location or locations in the virtual area where the rule applies. In some examples, each of the rules optionally may include one or more attributes that specify a required role of the source, a required role of the sink, a priority level of the stream, and a requested data routing topology. In some examples, if there are no explicit switching rules defined for a particular part of the virtual area, one or more implicit or default switching rules may apply to that part of the virtual area.

Governance rules control who has access to resources (e.g., the virtual area itself, regions with the virtual area, and objects within the virtual area), who has access to data (e.g., data streams and other content) that is associated with the virtual area, what is the scope of that access to the data associated the virtual area (e.g., what can a user do with the data), and what are the follow-on consequences of accessing that data (e.g., record keeping, such as audit logs, and payment requirements). In some examples, an entire virtual area or a zone of the virtual area is associated with a "governance mesh" that enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

A permission rule defines a respective capability requirement (e.g., for a respective action, behavior, or state) in terms of one or more capabilities, attributes, and settings, which may be persistent or transient. Examples of capabilities systems for administering permission rules are described in U.S. Provisional Patent Application No. 61/535,910, filed Sep. 16, 2011.

In some examples, a virtual area is defined by a specification that includes a description of geometric elements of the virtual area and one or more rules, including switching rules and governance rules. Examples of virtual area specifications are described in U.S. patent application Ser. No. 12/418,243, filed Apr. 3, 2009, U.S. patent application Ser. No. 12/818,517, filed Jun. 18, 2010, U.S. patent application Ser. No. 12/855,210, filed Aug. 12, 2010, and U.S. Provisional Patent Application No. 61/563,088, filed Nov. 23, 2011.

The virtual area platform 18 enables a wide variety of highly customizable virtual area applications to be created. Examples of such applications include virtual area applications for creating a virtual office, a virtual personal space, a virtual art gallery, a virtual concert hall, a virtual auditorium, a virtual conference room, and a virtual clubhouse. The virtual area platform 18 supports the creation of virtual area applications that define network connections between network nodes in the same zone of a virtual area, as well as one-way or two-way network connections between network nodes in different zones.

Figure 3:
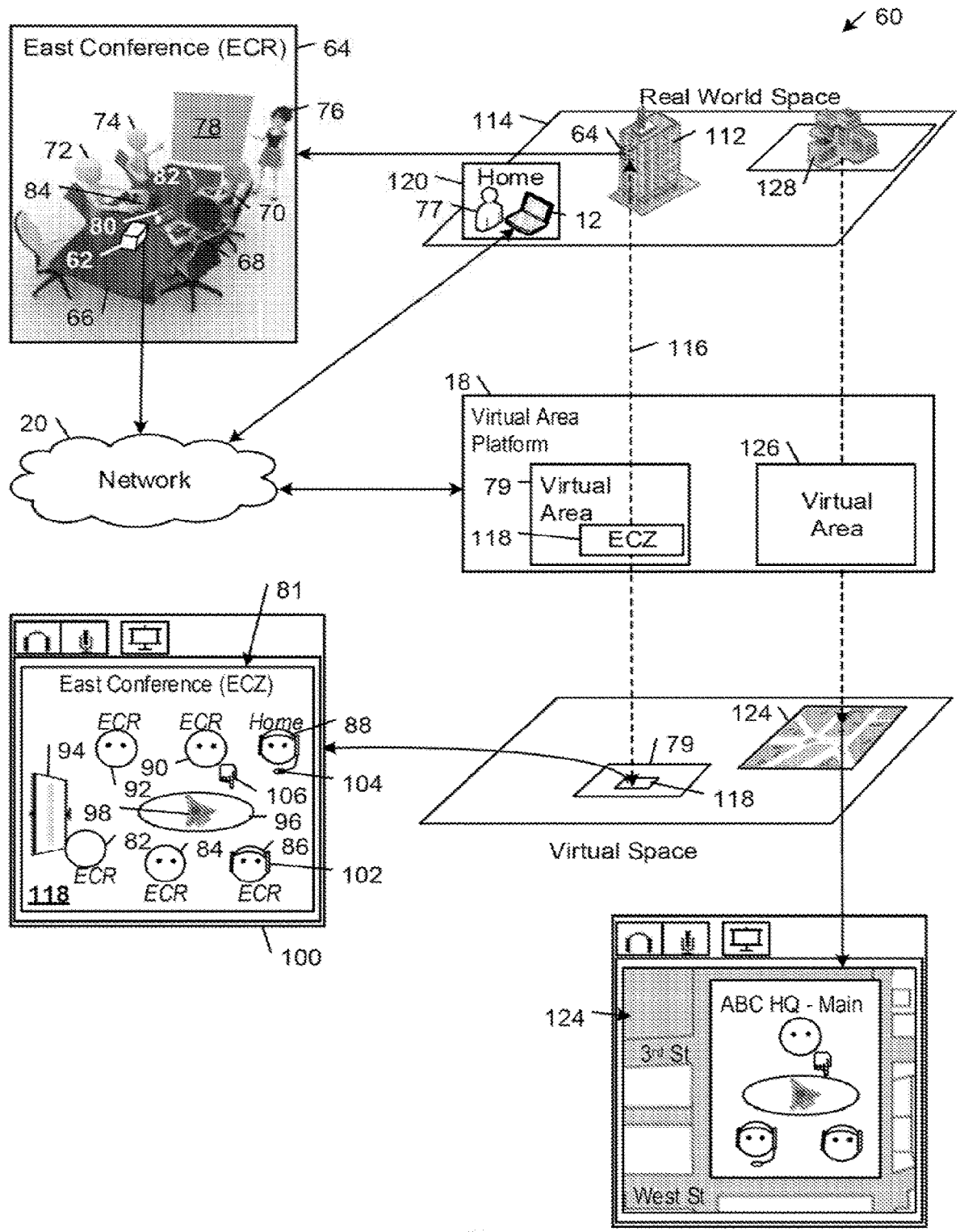
FIG. 3 is a diagrammatic view of an example of the network communications environment of FIG. 2 in which virtual presence apparatus bridges communicant interactions between a physical area and a virtual area.

FIG. 3 shows an example 60 of the network communications environment 10 in which the network 20 interconnects the virtual area platform 18, the remote client network node 12, and virtual presence apparatus 62 that is located in a physical space 64.

In the illustrated example, the virtual presence apparatus 62 is positioned on a table 66 in a real world conference room (the "East Conference" room) containing five communicants 68, 70, 72, 74, 76, where the four communicants 68-74 are seated around the table 66, and the fifth communicant 76 is standing beside a viewscreen 78. The communicants 68-72 are operating respective client network nodes 80, 82, 84 (e.g., mobile computers, such as laptop computers, tablet computers, and mobile phones). A communicant 77 is operating the remote client network node 12 in a real world residential building 120 (the "Home" location). The client network nodes 12, 80, 82, 84 are running virtual area enabled communications applications that establish respective presences for the communicants 68-72 and 77 in a particular one 79 of the virtual areas 46. The virtual presence apparatus 62 is logged into the virtual area 79 and interfaces the two communicants 74, 76 in the physical space 64 (who are not operating respective network nodes) with the virtual area 79 by, for example, transceiving realtime communications and other data (e.g., location data and co-presence data) between the physical space 64 and the network nodes of communicants in the virtual area 79.

The virtual presence apparatus 62 includes software and hardware resources that enable the virtual presence apparatus 62 to connect to the virtual area platform 18 and the client network nodes 12, 80-84, either directly (e.g., peer-to-peer) or through a hosted network connection. In some examples, the virtual presence apparatus 62 or a network node hosting the virtual presence apparatus 62 includes a complete or modified version of the virtual area enabled communications application 26 that provides functions for communicating with the virtual area platform 18 and establishing network connections and communicating realtime data streams with the client network nodes 12, 80-84. When connected to the virtual area platform 18, the virtual area platform 18 may register the virtual presence apparatus 62 in association with one or more virtual areas and/or log the virtual presence apparatus 62 into the one or more virtual areas. When logged into a virtual area, the virtual presence apparatus 62 transduces human perceptible stimulus (e.g., audio, visual, mechanical, and other sensory stimulus) between the physical space 64 and the client network nodes of communicants who are present in the virtual area 79. In this way, the virtual presence apparatus 62 bridges a physical experience of the physical space 64 to communicants in the virtual area 79 and bridges communicant interactions in the virtual area 79 to communicants in the physical space 64.

An example of the virtual presence apparatus 62 includes an input transducer, an output transducer, a communication interface, a computer-readable memory that stores a globally unique identifier of the virtual presence apparatus, and a processor. The virtual presence apparatus 62 typically encodes output data generated by the input transducer from communicant activity in the physical space 64 into an output signal that is sent to the network nodes 12, 80-84 that are connected to the virtual area; the virtual presence apparatus 62 also typically decodes input signals that are received from the remote network nodes 12, 80-84 in connection with the virtual area, into input data that is sent to the output transducer.

The input transducer generates output data from human perceptible stimulus 82 in the physical space 64. The input transducer typically generates the output data from human perceptible stimulus that is broadcasted into the physical space. Depending on the desired communication application, the input transducer may generate output data from one or more human perceptible stimuli, including for example audio, visual, mechanical, and other sensory stimuli. In some examples, the input transducer includes one or more of an acoustic-to-electric transducer (e.g., a microphone, which may be a component of a telephony device, such as a mobile phone or a VoIP phone, or a headset), a light-to-electric transducer (e.g., a camera, such as a still image camera, a video camera, and a scanner that scans physical documents into scanned images), an electric-to-electric transducer (e.g., a touchscreen or other touch-sensitive sensor equipped with resistive, capacitive, surface acoustic wave, optical, or other touch-sensitive technologies), a mechanical-to-electric transducer (e.g., a tactile or other pressure- or force-sensitive transducer, a texture-sensitive transducer), and a chemical-to-electric transducer (e.g., a olfactory sensor that is capable of detecting one or more odorants).

The output transducer generates human perceptible stimulus in the physical space 64. The output transducer typically broadcasts the human perceptible stimulus into the physical space. Depending on the desired communications application, the output transducer may generate one or more human perceptible stimuli from input data, including for example audio, visual, mechanical, and other sensory stimuli. In some examples, the output transducer includes one or more of an electric-to-acoustic transducer (e.g., a speaker, which may be a component of a telephony device, such as a mobile phone or a VoIP phone, or a headset), an electric-to-light transducer (e.g., an image projector such as a digital projector, a touchscreen display, a light beam projector such as a laser pointer, or a three-dimensional hologram generator), an electric-to-mechanical transducer (e.g., a haptic transducer, an electric motor that moves mechanical components, such as light sources and robot tools, and other components in the physical space, and a printer that outputs printed documents or three-dimensional objects), and an electric-to-chemical transducer (e.g., an electric odorant delivery system).

The virtual presence apparatus 62 may be implemented in a variety of different ways. In some examples, the virtual presence apparatus 62 is composed of multiple components (e.g., two or more of a speaker, a microphone, a light projector, and a camera) that are integrated into a unitary device. In other examples, the virtual presence apparatus 62 is composed of a central hub (e.g., a virtual area enabled network switch or router) that controls and configures one or more separate and distinct peripheral components (e.g., a speakerphone, a digital projector, a camera, and a remote-controlled laser pointer) that are connected to respective ports (e.g., Universal Serial Bus (USB) ports) of the hub. Examples of the virtual presence apparatus 62 may have different industrial designs. In some examples, the virtual presence apparatus 62 has the form factor of a desktop appliance (e.g., a form factor similar to that of a computer, speakerphone, a digital projector, or a network hub), whereas other examples of the virtual presence apparatus 62 have robotic form factors (e.g., a remote-controlled electromechanical machine).

Additional details regarding the construction and operation of examples of the virtual presence apparatus 82 are described in U.S. patent application Ser. No. 13/554,051, filed Jul. 20, 2012, and U.S. patent application Ser. No. 13/554,084, filed Jul. 20, 2012.

In some examples, the virtual area platform 18 establishes a respective presence in the virtual area 79 for a communicant based on a determination that the communicant is in the physical space 64.

In some examples, the virtual area platform 18 receives location data (e.g., location based services data, such as Global Positioning System (GPS) data) that is associated with the particular communicant (e.g., by a GPS component of a mobile device, such as a mobile phone or other mobile communication device), and determines that the particular communicant is in the physical space based on comparison of the received location data with location data associated with the physical space. In other examples, the virtual area platform 18 determines that a communicant is in the physical space 64 based on sensor data (e.g., image data, motion sensing data, speech detection data) that is generated by the virtual presence apparatus 62 and transmitted to the virtual area platform 18.

In addition to detecting the presence of communicants in the physical space 64, the virtual area platform 18 also typically attempts to identify the communicants who are in the physical space 64. In some examples, the virtual presence apparatus 62 includes an input device (e.g., a microphone, a camera, a magnetic stripe reader, a bar code reader, a proximity reader, a smart card reader, a biometric reader, or a wireless reader, such as a RFID reader or a Bluetooth reader) that acquires communicant identifying information that the virtual area platform 18 can use to identify communicants who are present in the physical space 64. In some examples, the virtual presence apparatus 62 captures images of communicants in the physical space 64 and sends the captured images to the virtual area platform 18, which recognizes faces in the images using face recognition image processing techniques. In some examples, the server network node 42 receives audio data from the virtual presence apparatus 62, and associates the audio data with a communicant in the physical space 64 based on comparison of the audio data with one or more voice data records that are associated with respective communicants. The voice records typically correspond to voiceprints (also referred to as voice templates or voice models) that are created from features that are extracted from the recorded speech of known communicants in accordance with a speaker recognition enrollment process. Each voiceprint is associated with the identity of a particular communicant. The virtual area platform 18 typically associates the audio data with the communicant's identity in response to a determination that features extracted from the audio data correspond to the voiceprint previously associated with the communicant.

Using one or more of these or other identification techniques, the virtual area platform 18 automatically identifies communicants who are in the physical space 64 without requiring them to log into the virtual area platform 18 through respective client network nodes. Once a particular communicant in the physical space 64 has been identified, the virtual area platform 18 can automatically establish a presence for that communicant in the particular virtual area that is associated with the virtual presence apparatus 62, track utterances from that communicant in the audio data captured by the virtual presence apparatus 62, and present visual cues indicative of the state of that communicant's voice (e.g., speaking or silent) in the communications interfaces that are displayed to the communicants who are present in the virtual area. In some examples, subject to any applicable permissions and capabilities that are associated with the virtual area, if a particular communicant is determined to be present in the physical space 64 but cannot be identified, the virtual area platform 18 establishes a presence for that communicant in the associated virtual area without naming or otherwise identifying that communicant in the communications interface.

In the illustrated example, each of the virtual area enabled communications applications 26 running on the client network nodes 12, 80-84 provides a communications interface for receiving user commands and presents a respective spatial visualization 81 of a zone 118 (the "East Conference" zone, or ECZ) of the virtual area 79 in accordance with data received from the virtual area platform 18. The spatial visualization 81 includes respective graphical representations 82, 84, 86, 88, 90, 92 (referred to herein as "avatars" or "sprites") of the communicants who are present in the virtual area 46 in the spatial visualization 81. In the illustrated example, the sprites 82, 86, 88 represent the three communicants 68, 70, 72 who are seated in the physical space 64 and are operating the local client network nodes 80, 82, 84, the sprite 88 represents the communicant 77 who is operating the remote client network node 12, the sprite 92 represents the seated communicant 74, and the sprite 82 represents the communicant 76 who is standing beside the viewscreen 78 in the East Conference room 64. The spatial visualization 81 may include other objects. Examples of such objects include a viewscreen object 94 for interfacing with application sharing functions of the platform (as described in, e.g., U.S. patent application Ser. No. 12/418, 270, filed Apr. 3, 2009), a table object 96 for interfacing with file sharing functions of the platform, and a VPA object 98 for interfacing with the virtual presence apparatus 62 in the physical space 64. The spatial visualization 81 typically is presented in a respective window 100 that is generated by the virtual area enabled communications application 26 on a "desktop" or other system-defined, base window on the display hardware of the client network nodes 12, 80-84.

In the illustrated example, the activities of the communicants in the virtual area can be inferred from the activities on the various communication channels over which the respective client network nodes are configured to communicate. The activities on the communication channels are represented in the graphical interface by visual cues that are depicted in association with the graphical representations 82-92 of the communicants. For example, the "on" or "off" state of a communicant's local speaker channel is depicted by the presence or absence of a headphones graphic 102 on the communicant's sprite. Men the speakers of the communicant who is represented by the sprite are on, the headphones graphic 102 is present (see sprites 86, 88) and, when the communicant's speakers are off, the headphones graphic 102 is absent. The "on" or "off" state of the communicant's microphone is depicted by the presence or absence of a microphone graphic 104 on the communicant's sprite. When the microphone is on, the microphone graphic 104 is present (see sprite 88); and, when the microphone is off, the microphone graphic 104 is absent. The headphones graphic 102 and the microphone graphic 104 provide visual cues of the activity states of the communicant's sound playback and microphone devices. In addition, the current activity on a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar.

The activity on a communicant's text chat channel is depicted by the presence or absence of the hand graphic 106 adjacent the communicant's sprite (see sprite 90). Thus, when a communicant is transmitting text chat data to another network node the hand graphic 106 is present, and when a communicant is not transmitting text chat data the hand graphic 106 is not present. In some embodiments, text chat data is transmitted only when keyboard keys are depressed, in which case the visualization of the communicant's text channel appears as a flashing on and off of the hand graphic 106.

The viewscreen object 94 is associated with application sharing functionality of the platform that enables communicants to share applications operating their respective client network nodes. The application sharing functionality is invoked by activating a viewscreen object 94 (e.g., by single-clicking the viewscreen object with an input device). In some embodiments, the platform provides visual cues that indicate whether or not a communicant is sharing an application over an application sharing channel. In response to a communicant's selection of the viewscreen object 94, the communicant's sprite automatically is moved to a position in the graphical representation of the virtual area that is adjacent the viewscreen object 94. The position of a communicant's sprite adjacent the viewscreen object 94 indicates that the communicant currently is sharing or is about to share an application with the other communicants in the virtual area. In addition, the avatar of each communicant who is viewing a shared application is depicted with a pair of "eyes" to indicate that the represented communicants are viewing the content being shared in connection with the viewscreen object 94. The graphical depiction of a viewscreen object 94 is changed depending on whether or not an active application sharing session is occurring. For example, the depicted color of the viewscreen object 94 may change from a brighter color during an active application sharing session to a darker color when there is no application sharing taking place. Examples of the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

In some examples, the virtual area platform 18 enhances the immersive connections between virtual area locations (e.g., virtual area and/or virtual area zones) and physical spaces by creating persistent associations between the virtual area locations and the respective physical spaces. The virtual area platform 18 typically stores these persistent associations in in a table or other data structure that maps each real world location to a respective area/zone. In some of these examples, the virtual area platform 18 reinforces these associations in the visualizations of the virtual area locations that connote the real world physical spaces (e.g., by having a virtual presentation that resembles one or more distinctive visual features of the real world physical space or by including a descriptive name or other label that is associated with the real world physical space).

In the illustrated example, the physical area 64 is a conference room (the "East Conference" room) in a building 112 in a real world space 114. The virtual area platform 18 has created a persistent association 116 between the East Conference Room 64 of the building 112 and the East Conference zone 11B of the virtual area 79. The virtual area platform 18 reinforces this association in the visualization 81 of the virtual East Conference zone 118 of the virtual area 79 that connote the elements of the corresponding real world East Conference room 64 of building 112. In the example shown in FIG. 3, the virtual East Conference zone 118 is labeled with a name (e.g., East Conference) that corresponds to the name that identifies the corresponding real world East Conference room. The virtual presentation 81 of the virtual East Conference zone 118 also includes respective features (e.g., the number, placement, and orientation of the virtual viewscreen object 94, the table object 96, and the virtual presence apparatus object 98) that correspond to distinctive visual features of the associated real world East Conference room 64.

The resulting visualization 81 of the East Conference zone 118 allows a user to see conversations and other interactions between communicants who are located in different physical spaces (i.e., the East Conference room 64 and the Home 120 of communicant 77) in a single view according to a spatial metaphor that allows the user to quickly learn who is meeting with whom and the context of those interactions (as defined by the virtual zone in which the meeting is occurring and the physical locations of the individual communicants). In addition, the virtual presence apparatus object 98 in the East Conference zone 118 provides an interface for remote communicants in the virtual East Conference zone 118 to interact with the associated virtual presence apparatus 62 in the real world East Conference room 64 and thereby be bridged into that physical space.

FIG. 3 also shows another example of a graphical visualization 124 of a virtual area 126 that is persistently associated with a real world building 128. The spatial visualization 124 of the virtual area 126 is generated the communications applications 26 running on the client network nodes of the communicants in a zone (the "ABC HQ—Main" zone) of the virtual area 126. In this example, the virtual area visualization 124 is a map view that shows a virtual representation of a real world geographic area in which the real world building 128 (ABC HQ) is located and emphasizes the persistent association between the virtual area 126, the real world building 128, and the real world location of the building 128.

In some examples, communicants' real world and virtual states are separate layers of experience that drive interfaces for visualizing those layers. In some examples, communicants' real world locations and virtual locations are reflected in the representations of the communicants and their interactions in virtual areas. For example, some of these representations depict socially relevant information regarding the current real world locations and virtual locations of communicants. Such information includes indications of the current real world locations of the communicants, indications of the current virtual locations of the communicants, indications of the communicants who currently are physically co-present, and indications of the communicants who currently are virtually co-present.

In some examples, the virtual area platform 18 determines the real world locations of the communicants who are in a virtual area. The virtual area platform 18 may determine the real world location information in a variety of different ways. In some examples, a communicant's network node reports its current real world location (e.g., location based services data, such as GPS data) to the virtual area platform 18. In other examples, the virtual area platform 18 determines the presence of communicants in the physical space 64 based on the known physical location of the virtual presence apparatus 62 together with data generated by one or more sensors (e.g., a microphone, a camera together with image processing and depth sensing technologies, a magnetic stripe reader, a bar code reader, a proximity reader, a smart card reader, a biometric reader, or a wireless reader, such as a RFID reader or a Bluetooth reader) associated with the virtual presence apparatus 62. The virtual area platform 18 may learn the physical location of the virtual presence apparatus 62 from, for example, a real world location entered by an administrator, or other data (e.g., GPS data or network address data) that is transmitted to the virtual area platform 18. Based on the known location of the virtual presence apparatus 62, the virtual area platform 18 may determine that any communicants that are detected near the virtual presence apparatus 62 are in the same physical location as the virtual presence apparatus 62. In some examples, the virtual presence apparatus 62 uses the sensor data to determine the locations of detected communicants relative to the virtual presence apparatus 62. Based on this relative position information, the virtual area platform 18 may determine the positions of the communicants in the physical area 64 relative to one another or relative to objects (e.g., a viewscreen) in the physical area 64, and reflect those positions in the presentation of the communicants in the visualization of the associated virtual area.

In the illustrated example, the virtual area platform 18 associates with each avatar a respective label that describes the determined physical locations of the associated communicant. For example, each of the avatars 82, 84, 86, 90, 92 corresponding to the communicants who are located in the East Conference room 64 is associated with the location label "ECR" that denotes the East Conference room 64, and the avatar 88 (which corresponds to the communicant 77 in the real world home location) is associated with the location label "Home" that denotes the Home physical space 120. This location based information is socially relevant to the remote communicant 77 because he otherwise would not know that the other communicants in the virtual East Conference zone 118 are all physically co-located in the real world East Conference room 64, information which the remote communicant 77 would need in order to notice or understand nuances in the communications between the other communicants that might arise from their physical co-presence.

Figure 4:
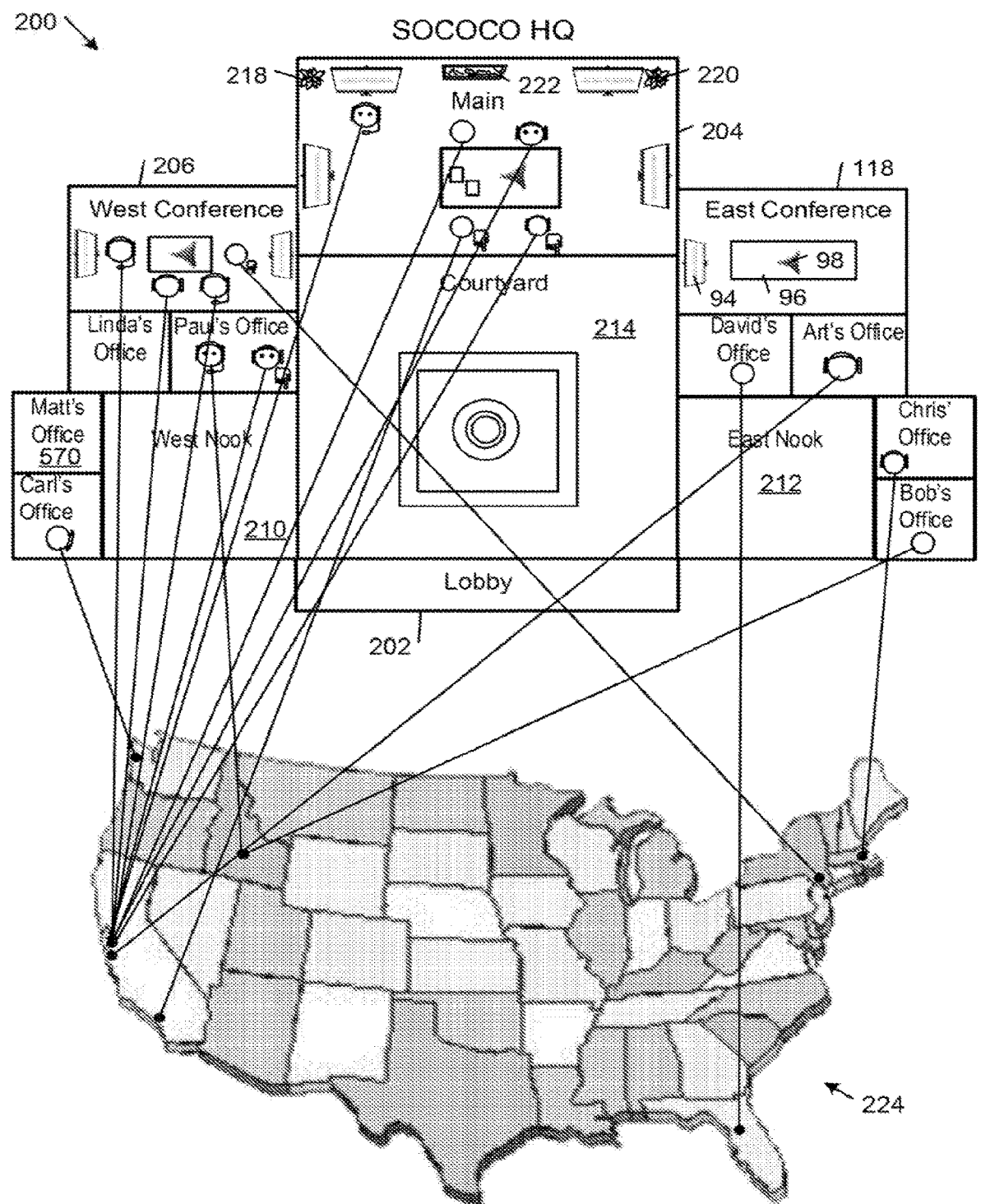
FIG. 4 is a diagrammatic view of an example of a mapping between graphical representations of communicants in a spatial visualization of a virtual area and real world locations in a physical area.

FIG. 4 shows an example of a two-dimensional visualization of a virtual area 200 (the "SococoHQ" virtual area). The SococoHQ virtual area 200 includes a lobby zone 202, a Main zone 204, a West Conference zone 206, the East Conference zone 118 shown in FIG. 3, a West Nook zone 210, an East Nook zone 212, a Courtyard zone 214, and sixteen office zones. The conference zones 118, 204, 206 include respective viewscreen objects, table objects, and objects representing respective virtual presence apparatus, and supports realtime audio, chat, and application and network resource sharing communications between the network nodes in the same conference zone. Each of the offices includes respective viewscreen objects (not shown) and a respective telephony object (not shown) and supports realtime audio, chat, and application and network resource sharing communications between the network nodes in the same office. Each of the telephony objects supports shared dial-in and dial-out telephony communications as described in U.S. patent application Ser. No. 13/165,729, filed Jun. 21, 2011, and communicants interacting with the telephony objects are represented by avatars that decorated with a graphical representation of a telephone (see, e.g., the avatar 216 in Carl's Office). Each of the West Nook zone 210, East Nook zone 212, and Lobby zone 202 respectively supports realtime audio and chat communications between the network nodes in the same zone.

In some examples, the conference zones 118, 204, 206 are associated with different real world physical spaces. The different real world physical spaces may be physically connected to or proximate one another (e.g., rooms connected by a common structure, such as rooms in an office building, or disconnected rooms of related co-located structures, such as rooms in a distributed office building complex) or they may be physically separated from one another (e.g., rooms in separate and distinct real world office buildings, which may be in the same or different geographic regions). The virtual area platform 18 reinforces these associations with visual cues in the visualizations of the virtual area locations that connote the corresponding real world physical spaces. In the example shown in FIG. 4, each of the virtual conference rooms 118, 204, 206 is labeled with a respective name (e.g., Main, West Conference, and East Conference) that corresponds to the name that is used to identify the corresponding real world physical space. In addition, virtual presentations of the virtual conference zones 118, 204, 206 include respective features (e.g., the number and placement of virtual viewscreen objects, virtual plants 218, 220 and virtual artwork 222) that correspond to distinctive visual features of the associated real world physical spaces. The resulting visualization of the SococoHQ virtual area 200 allows a user to see multiple concurrent independent conversations and other interactions that are occurring in different physical spaces in a single view in which the interactions are organized according to a spatial metaphor that allows the user to quickly learn who is meeting with whom and the contexts of those meetings (as defined by the zones in which the meetings are occurring). In addition, the virtual presence apparatus objects in the virtual conference zones 118, 204, 206 provide interfaces for communicants in the virtual area 200 to interact with the associated virtual presence apparatus and thereby be bridged into the corresponding physical spaces.

Referring to FIG. 4, each of the communicants in the SococoHQ virtual area 200 is located in a respective geographic location that is indicated in the map view 224, which shows a virtual representation of a real world geographic area in which the communicants are located physically. In some cases, multiple of the communicants in the same zone of the SococoHQ virtual area 200 are physically co-located in the same geographic area. As explained above, the physical co-presence of communicants who also are in the same virtual zone is socially relevant to communicants who are present in that zone but not in the same physical space because physical co-location changes the social context of the interactions between the communicants. For example, knowing that communicants are co-present in the same physical space, typically will affect how the remote communicants interpret interactions between the physically co-located communicants and how the remote communicants interact with the physically co-located communicants. For at least these reasons, it is desirable to reflect the physical co-presence of communicants in the visualization of the virtual areas and zones in the communications interfaces that are presented to the remote communicants in the same virtual areas and zones.

Figure 5:
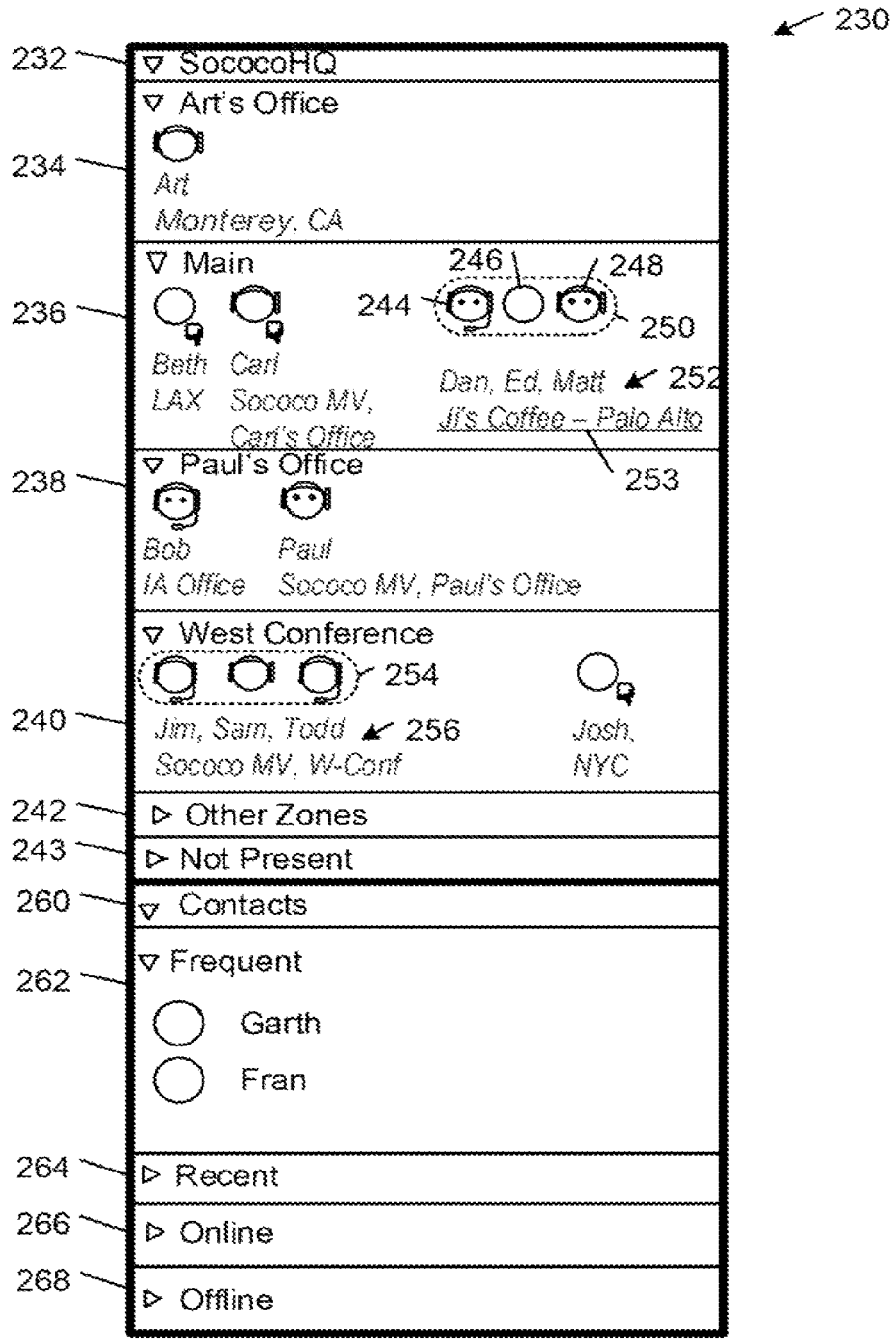
FIG. 5 is a diagrammatic view of an example of a graphical user interface.

FIG. 5 shows an example of a people panel graphical user interface 230 that is generated by an example of the virtual area enabled communications application 26 in a window on a display of the client network node from which a user of the client application ("Art" in this example) is operating. The people panel 230 depicts the realtime availabilities and activities of communicants that are associated with Art (e.g., by being a contact of Art or being a member of or present in a virtual area of which Art is a member) across different communication contexts.

In the people panel 230, each communicant is represented graphically by a respective circular sprite (or avatar) that is associated with a respective name of the communicant (i.e., "Art," "Beth," "Carl," "Dan," "Ed," "Fran," and "Garth") and a status line that includes additional information about the communicant, such as physical location of presence, availability (e.g., busy, idle), a status message (e.g., "Out of the office next Wednesday"), and the name of the client node from which the communicant is operating (e.g., "workstation 1" or "mobile phone"). As explained above, the virtual area platform 18 monitors the activities on various communication channels over which the respective communicants are configured to communicate in the virtual areas and generates state data that indicate state information about the communicants and real-time data streams (RDS) that indicate the current realtime activities of the communicants. These states and activities are represented by visual cues that are depicted in association with the graphical representations of the communicants in the people panel 230.

The people panel 230 is associated with filtering criteria that highlight interaction activities grouped by virtual area and by zone within each virtual area, allowing the user to readily determine where the potentially interesting interactions are occurring across the user's areas of membership. In the illustrated example, the people panel 230 shows the realtime availabilities and activities of the communicants who are present in the SococoHQ virtual area 200. The people panel 230 includes a header bar 232 that includes a descriptive label associated with the virtual area (e.g., the name of the virtual area and other information, such as an announcement, relating to the virtual area) and a respective toggle control that can be toggled to selectively collapse and expand the SococoHQ section of the people panel 230. In the illustrated example, the SococoHQ section is expanded.

Within the SococoHQ section, the communicants who are present in the virtual area are grouped as follows: the communicants in the user's current zone of presence (i.e., Art's Office in this example) are displayed in a capsule 234 at the top of the SococoHQ section; next, communicants who are co-presence with other communicants in respective zones of the virtual area are displayed in respective zones of co-presence capsules 236, 238 240; the communicants who are alone in respective zones of the virtual area are displayed in a respective "Other Zones" capsule 242 (shown collapsed); and the communicants who are members of the SococoHQ virtual area but currently are not present are listed in a "Not Present" capsule 243 (shown collapsed). The zones of co-presence filtering criteria identify those communicants who are co-present in respective zones of a virtual area. Thus, for each virtual area, the communicants in each group of two or more co-present communicants in the same zone of the virtual area are listed in a separate, selectively expandable and collapsible zone of co-presence capsule 236-240 in a respective section of the people panel 230. The depiction of the zones of co-presence enables Art to readily visualize all of the conversations that are occurring across all of the communication contexts that are defined by the virtual areas of which Art is a member. In this way, Art can determine whether or not there are any ongoing conversations that he would like to join.

In some examples, each of the co-presence capsules 234-240 is associated with a respective descriptive user navigable link that may reference, for example, the associated zone of co-presence or a Real World View of a physical location that is mapped to the associated zone of co-presence. The link may be, for example, a URI link that includes the name of the associated zone or physical location, along with other information, such as a label that describes the topic of a meeting currently taking place in the zone (e.g., "Daily Standup" or "Sales Management Meeting"). In some examples, each of the co-presence capsules 234-240 also is associated with a respective door icon (not shown) that reflects the current state (e.g., open or closed) of the door object that is associated with the zone. In this way, the user can quickly determine of the type of meeting that is occurring in the respective zones (e.g., an open or casual meeting, or a closed or private meeting). Additional details regarding the navigatable links and door objects are described in U.S. patent application Ser. No. 13/487,159, filed Jun. 2, 2012.

Within each of the co-presence capsules 236-240, the communicants who are present in the associated zone additionally are grouped by physical co-presence. In the illustrated example, the communicants Beth, Carl, Dan, Ed, and Matt are co-present in the virtual Main zone of the SococoHQ virtual area. In addition to being virtually co-present, Dan, Ed, and Matt also are physically co-present in Ji's Coffee, which is a real world location in Palo Alto, California. The physical co-presence of Dan, Ed, and Matt is depicted in the people panel 230 by grouping their avatars 244, 246, 248 within a physical co-presence capsule 250 and by merging their respective status lines into a single status line 252 that identifies their physical location of co-presence (i.e., "Ji's Coffee—Palo Alto," which also is associated with a user navigatable URI link 253 that references an associated virtual area or zone, or a Real World View of the associated real world location). Similarly, the communicants Jim, Sam, Todd, and Josh are co-present in the virtual West Conference zone of the SococoHQ virtual area. In addition to being virtually co-present, Jim, Sam, and Todd also are physically co-present in the real world West Conference room in the Sococo Mountain View office. The physical co-presence of Jim, Sam, and Todd is depicted in the people panel 230 by grouping their avatars within a physical co-presence capsule 254 and by merging their respective status lines into a single status line 256 that identifies their physical location of co-presence (i.e., "Sococo MV, W-Conf").

Typically, the virtual area platform 18 automatically determines the physical co-presence of communicants by applying a co-presence predicate to the real world locations of the communicants, locations which may be determined, for example, using any of the communicant locating methods described herein. In some examples, the virtual area platform 18 determines that communicants are physically co-present if the real world locations of the communicants satisfy a proximity predicate (e.g., the communicants are within a particular distance from one another). In one example, the virtual area platform 18 determines that communicants operating respective network nodes are co-present if the locations of the network nodes can be circumscribed by a imaginary circular boundary with a diameter of at most a specified threshold length (e.g., three meters). In another example, the virtual area platform 18 determines that communicants are physically co-present if the locations of their network nodes network nodes are located within a specified distance of a target location (e.g., a fixed real world location, such as a location defined by specified latitude and longitude coordinates, or a transient real world location, such as the location of one of the network nodes).

The people panel 230 also includes: a Contacts section 260 that shows Art's contacts who are not members of the SococoHQ virtual area; a Frequent contacts section 262 in which Art's contacts are sorted by the frequency of their respective interactions with Art; a Recent contacts section 264 in which Art's contacts are sorted by the recentness of their respective interactions with Art; an Online contacts section 266 that lists all of Art's contacts who currently are online (i.e., connected to the network 20); and an Offline contacts group 268 that lists all of Art's contacts who currently are offline (i.e., disconnected from the network 20).

Figure 6:
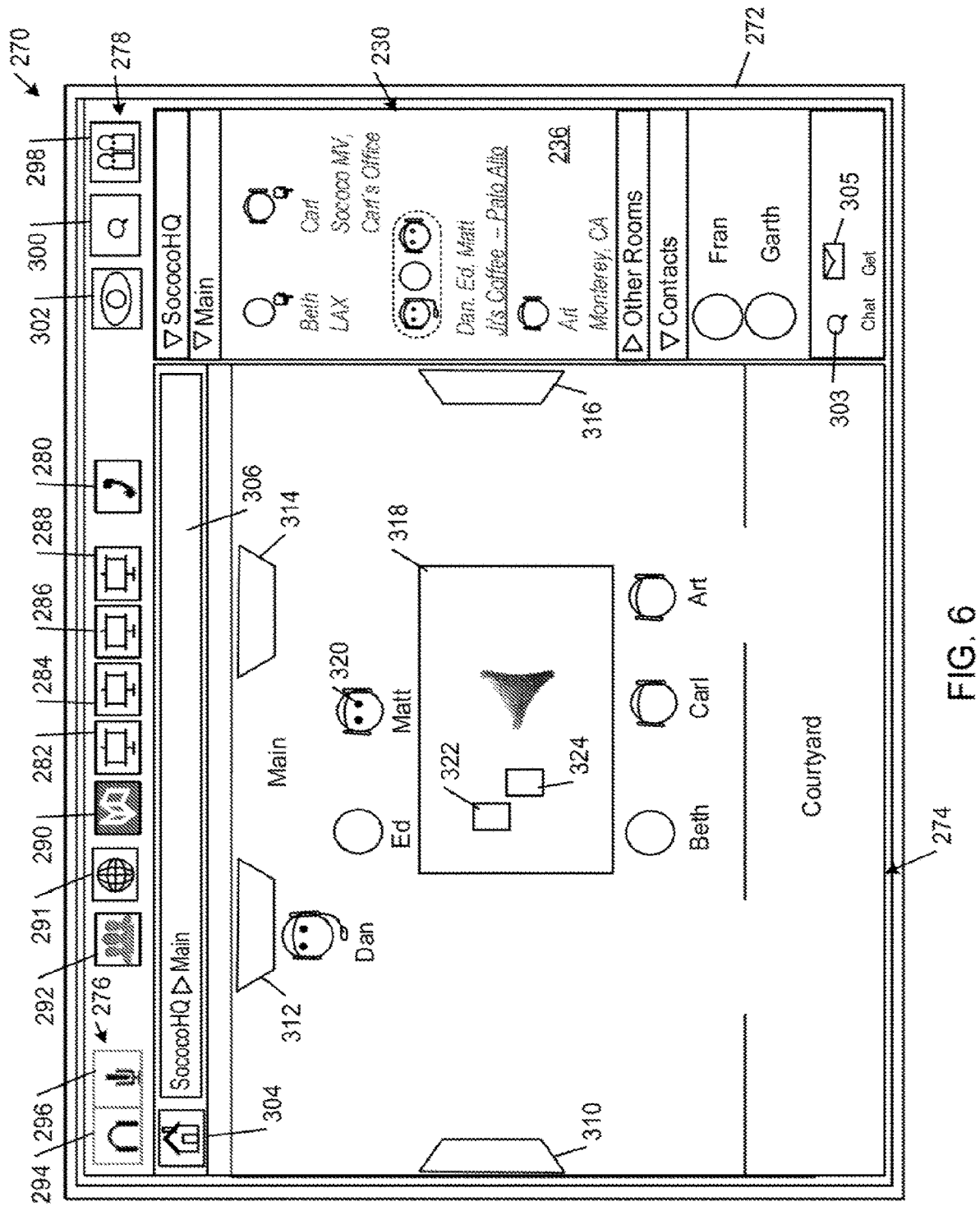
FIG. 6 is a diagrammatic view of an example of a graphical user interface.

FIG. 6 shows an exemplary graphical user interface 270 that is generated by an example of the virtual area enabled communications application 26 in a window 272 on a display of the user's client network node. The graphical user interface 270 includes the people panel 230, a viewer panel 274, an audio interaction toolbar 276, a set of panel view controls 278, a Phone button 280, a respective Viewscreen button 282-288 for each viewscreen object in the current zone of presence, a Virtual Area View button 290, a Real World View button 291, and a meeting button 292.

The audio interaction toolbar 276 includes a headphone control 294 that enables Art to toggle on and off the local speakers of the client network node, and a microphone control 296 that enables Art to toggle on and off the local microphone of the client network node.

The panel view controls 278 include a people panel button 298 for opening and closing the people panel 230, a chat panel button 300 for opening and closing a chat panel, and a viewer panel button 302 for opening and closing the viewer panel 274.

The Phone button 280 is associated with telephony related functionality of the platform that enables a user of a Public Switched Telephone Network (PSTN) terminal device to participate in virtual area based communications (e.g., by the PSTN terminal device user calling into a zone of the virtual area or by a user of the communications application 26 to call out to the PSTN terminal device user), as described in U.S. patent application Ser. No. 13/165,729, filed Jun. 21, 2011.

The Meeting button 292 sets the view presented in the viewer panel 274 to a user interface for visualizing assemblies of communicants in the virtual area, as described in U.S. patent application Ser. No. 13/432,837, filed Mar. 28, 2012.

The graphical user interface 270 also includes a home button 304 that is associated with a control that returns the user's presence to a designated "home" location in the virtual environment (e.g., a designed zone, such as a personal zone or other office that is assigned to the user). Additional details regarding the structure, function, and operation of examples of the navigation controls are described in U.S. patent application Ser. No. 12/354,709, filed Jan. 15, 2009.

The graphical user interface 270 also includes a Chat button 303 and a Get button 305. Selection of the Chat button 303 opens the chat panel that enables Art to initiate a chat with other communicants who are present in the area application where Art is present. Selection of the Get button 305 opens an invite window that enables Art to invite one or more communicants to a selected virtual area location. Additional details regarding embodiments of the methods and functions invoked by the Chat button 303 and the Get button 305 are described in U.S. patent application Ser. No. 12/354,709, filed Jan. 15, 2009, and U.S. Provisional patent application Ser. No. 13/209,812, filed Aug. 15, 2011.

Selection of the Virtual Area View button 290 sets the view presented in the viewer panel 274 to a spatial visualization of the virtual area.

In the example shown in FIG. 6, the viewer panel 274 is in the Virtual Area View mode (as denoted by the highlighted Virtual Area View button 290), which presents a spatial visualization of the SococoHQ virtual area 200 that is zoomed to the user's current zone of presence (i.e., SococoHQ/Main as shown in the location bar 306, which indicates that Main is a zone within the virtual area SococoHQ). Each of the communicants who is present in the SococoHQ/Main zone is represented graphically in the viewer panel 274 by a respective avatar that corresponds to the communicant's avatar shown in the Main zone capsule 236 of people panel 230. The SococoHQ/Main zone is represented graphically by a two-dimensional top view of a rectangular space. In some examples, the communicants' avatars automatically are positioned in predetermined locations (or "seats") in the SococoHQ/Main zone when the communicants initially enter the zone. In other examples, the communicants' avatars are positioned in the SococoHQ/Main zone at locations that reflect the communicants' relative locations in the physical space associated with the zone, as determined by the virtual presence apparatus 62 in the associated physical space 64.

The Main zone includes four viewscreen objects 310-316 and a table object 318. Communicants interact with the objects by selecting them with an input device (e.g., by single-clicking on the objects with a computer mouse, touch pad, touch screen, or the like). The viewscreen objects 310-316 are associated with application sharing functionality of the platform that enables communicants to share applications operating their respective client network nodes. The application sharing functionality is invoked by activating a viewscreen (e.g., by single-clicking the viewscreen object with an input device).

Each of the Viewscreen buttons 282-286 sets the viewer panel 274 to display the content the content being shared in connection with a corresponding one of the viewscreen objects in the current zone of presence or, if no content is being shared in connection with the current viewscreen object, to display a Share button that allows the user to initiate an application sharing session in connection with the selected viewscreen object.

In some examples, one or more of the viewscreen objects 310-316 may be associated with respective uniform resource identifiers (URIs) of network resources to enable communicants to interact with and share information associated with the network resources via the application sharing (e.g., web browser sharing) functionality associated with the viewscreen objects as described in U.S. patent application Ser. No. 13/399,737, filed Feb. 17, 2012.

The table object 318 is associated with file share functionality of the platform that enables communicants to upload computer data files to server storage in association with respective ones of the zones of the virtual area and to download data files that are associated with zones of the virtual area from the server storage to the respective client network nodes. In example shown in FIG. 6, there are two document objects 322, 324 that are associated with the table object 318 in the Main zone of the SococoHQ virtual area. The document objects 322, 324 are linked to respective documents that are have been shared in the virtual area and stored in server storage with an index that refers to the unique identifier of the Main zone. Any of the document objects 322, 324 may be selected by a communicant (e.g., by double-clicking the document object with an input device, such as a computer mouse) to initiate downloading of the associated document to the communicant's client network node. Additional details regarding the structure, function, and operation of the table object 318 may be obtained from U.S. patent application Ser. No. 12/354,709, filed Jan. 15, 2009.

The Real World View button 291 sets the view presented in the viewer panel 274 to a visualization of one or more real world locations associated with the virtual area.

Figure 7:
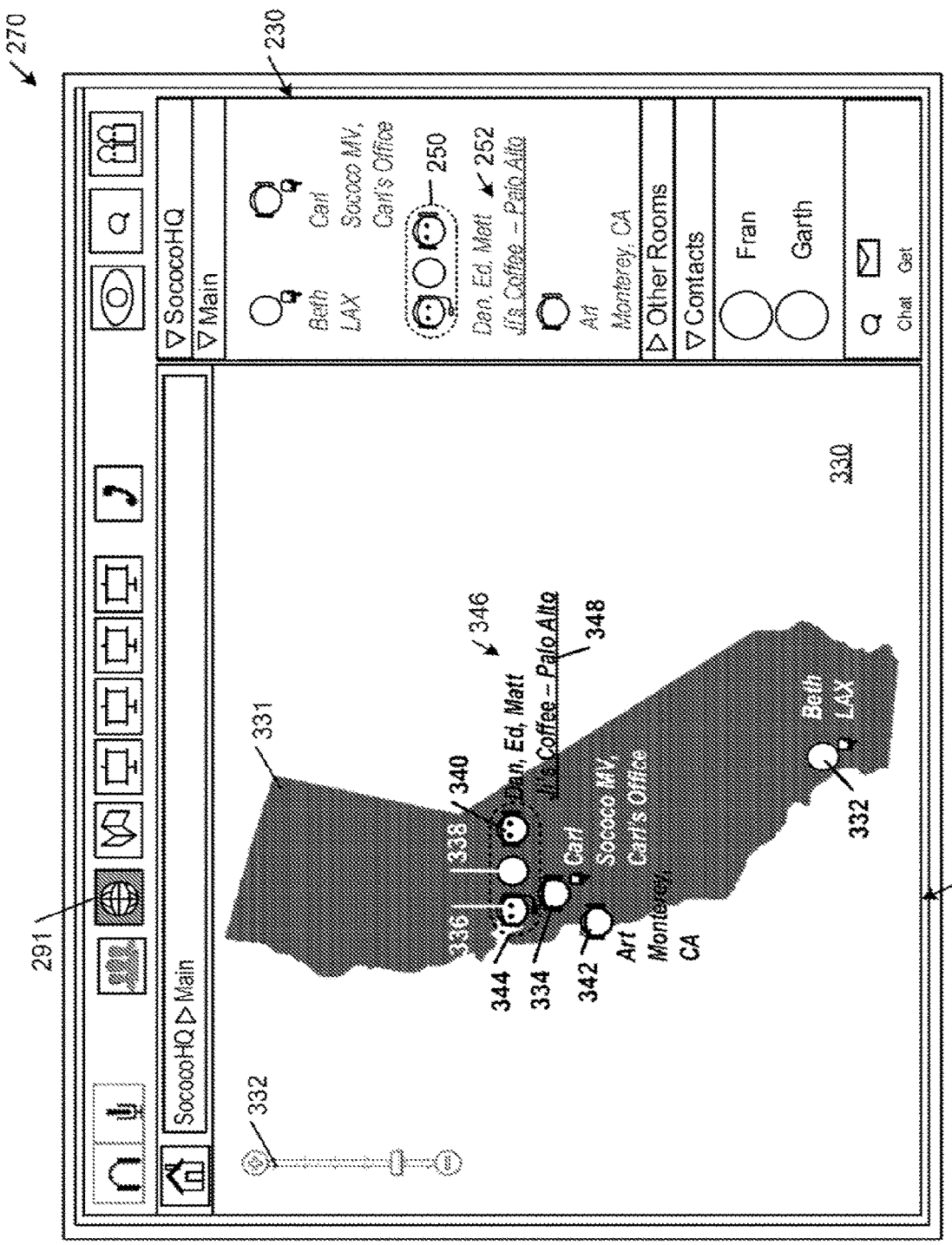
FIG. 7 is a diagrammatic view of an example of a graphical user interface.

FIG. 7 shows an example of the viewer panel 274 in the Real World View mode, which presents a spatial visualization 330 of the current real world locations of presence of the communicants in the user's current zone of presence of the SococoHQ virtual area (i.e., the Main zone of the SococoHQ virtual area).

In the illustrated example, the people panel 230 shows visual cues depicting the realtime interactions of the communicants Beth, Carl, Dan, Ed, Matt, and Art in the SococoHQ/Main zone. The people panel 230 also shows that Dan, Ed, and Matt are physically co-located in Ji's Coffee in Palo Alto, California by grouping the avatars of Dan, Ed, and Matt in the co-presence capsule 250 and presenting the status message 252, which describes the real world location of presence as "Ji's Coffee—Palo Alto."

The viewer panel 274 shows the spatial visualization 330 of the current real world locations of the communicants Beth, Carl, Dan, Ed, Matt, and Art in the SococoHQ/Main zone. The spatial visualization shows a virtual representation of the communicants' real world locations in which the communicants' avatars are positioned on a geographic map 331 at respective locations that correspond to the communicants' real world locations. In this regard, Beth's avatar 332 is positioned at the location of the Los Angeles International Airport (LAX), Carl's avatar 334 is positioned at the location of the Sococo office in Mountain View, California, the avatars 336, 338, 340 of Dan, Ed, and Matt are positioned at the location of Ji's Coffee in Palo Alto, California, and Art's avatar 342 is positioned at the location of Monterey, California. Each of the avatars 332-342 is associated with respective name of the communicant (i.e., "Art," "Beth," "Carl," "Dan," "Ed," and "Matt") and a status line that includes the communicants' current geographic location. The co-presence of Dan, Ed, and Matt at the same geographic location is demarcated by enclosing their avatars 336-340 in a co-presence capsule 344. The visualization 330 typically is zoomed automatically to a magnification level that allows all of the communicants' real world locations to be shown in the viewer panel 274. A zoom control 332 allows the user to change the magnification level of the visualization 330 presented in the viewer panel 274.

In some examples, the physical co-presence capsule 344 is associated with a status line 346 that includes the names of the co-present communicants and a descriptive, user-navigable link 348 that references an associated virtual area or zone, or a Real World View of the associated real world location. In the example shown in FIG. 7, the navigatable link 348 is associated with a label that describes the associated real world location (i.e., Ji's Coffee) and references a particular virtual area location (i.e., the Main zone of the Ji's Coffee virtual area).

Figure 8:
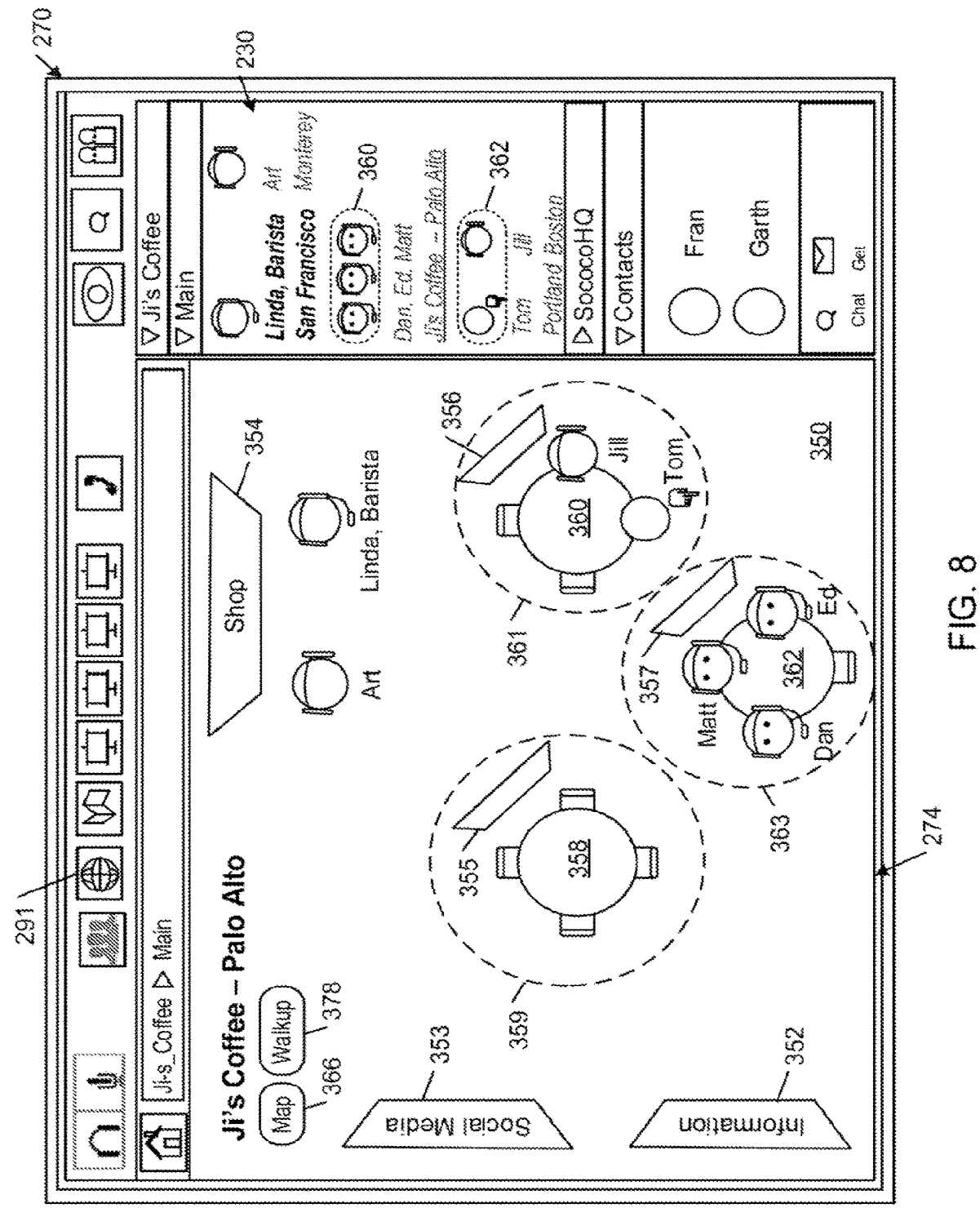
FIG. 8 is a diagrammatic view of an example of a graphical user interface.

FIG. 8 shows an example of a view the Main zone 350 of the Ji's Coffee virtual area that is presented in the viewer panel 274 in response to the user's selection of the link 348 that is associated with the physical co-presence capsule 344 shown in FIG. 7. The Main zone 350 of the Ji's Coffee virtual area includes six viewscreen objects 352, 353, 354, 355, 356, 357, and three table objects 358, 360, 362. The viewscreen objects 352-354 are respectively linked to information, social media, and shopping network resources, which are accessed by activating (e.g., with a user input device) the viewscreen objects 352-356. The viewscreen objects 355-357 are associated with application sharing functionality. Each of the table objects 358-362 has a set of four "seats" that define predetermined locations where communicant avatars can be positioned. Each table object 358-362 is located within a separate non-rendered table zone 359, 361, 363 that is associated with a respective set of switching rules that allows realtime audio, chat, application sharing, and file sharing between communicants in the same table zone. The Main zone 350 also is associated with switching rules that allow: audio communications between a communicant with the role of Barista (e.g., Linda) and the communicants in any of the table zones; and text chat communications between any communicants in the Main zone 350.

The people panel 230 depicts the avatars of the communicants who are in the Main zone 350 of the Ji's Coffee virtual area. The virtual co-presence of Dan, Ed, and Matt in the table zone 363 is depicted in the people panel 230 by grouping their avatars within a virtual co-presence capsule 360. Similarly, the virtual co-presence of Tom and Jill in the table zone 361 is depicted in the people panel 230 by grouping their avatars within a virtual co-presence capsule 362.

Figure 9:
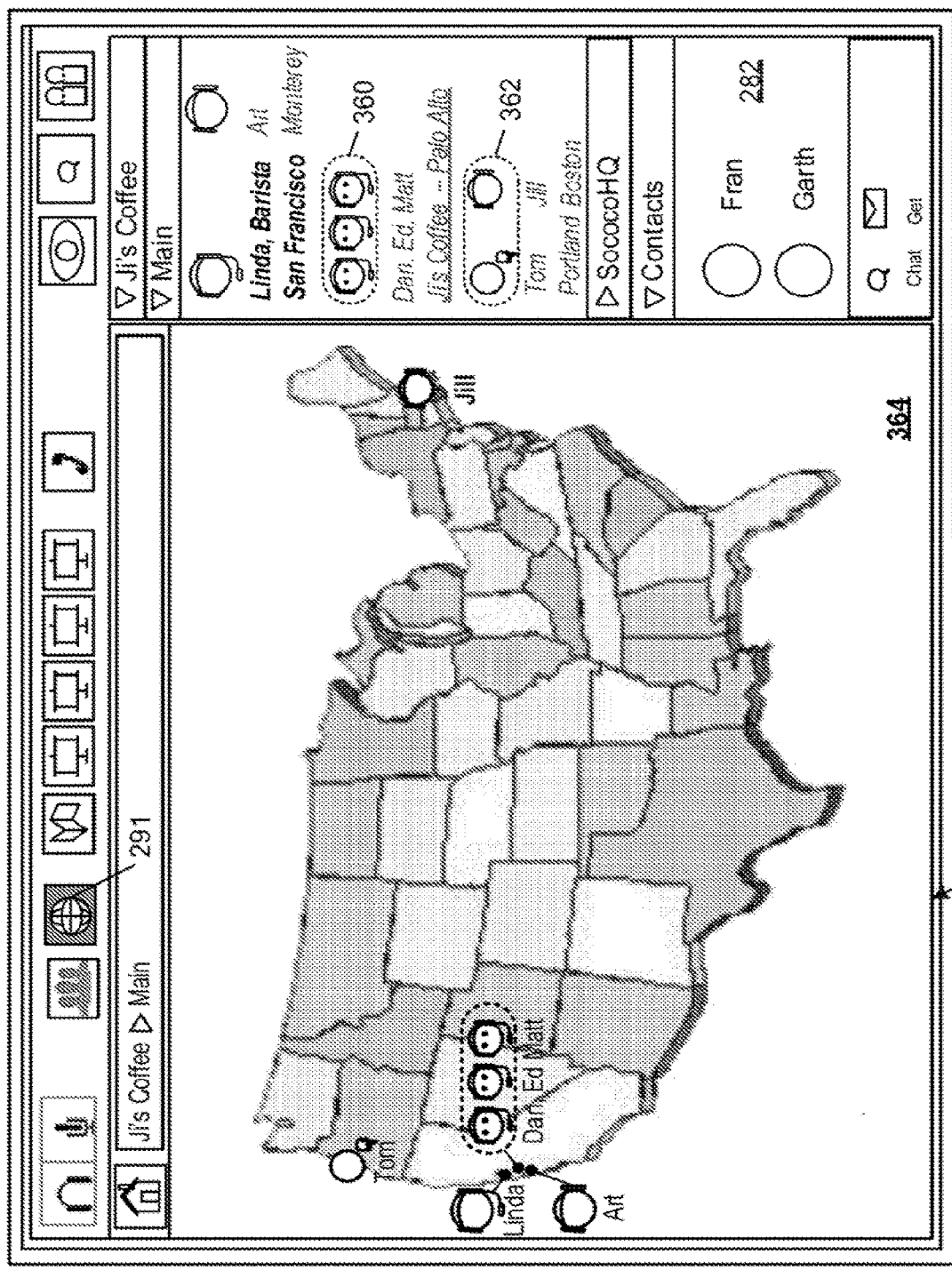
FIG. 9 is a diagrammatic view of an example of a graphical user interface.

By selecting the Real World View button 291, the user can change the view mode of the viewer panel 274 from the Virtual Area View mode shown in FIG. 8 to a Real World View mode shown in FIG. 9, which presents a spatial visualization 364 of the current real world locations of presence of the communicants in the user's current zone of presence in the Ji's Coffee virtual area (i.e., the Main zone).

Figure 10:
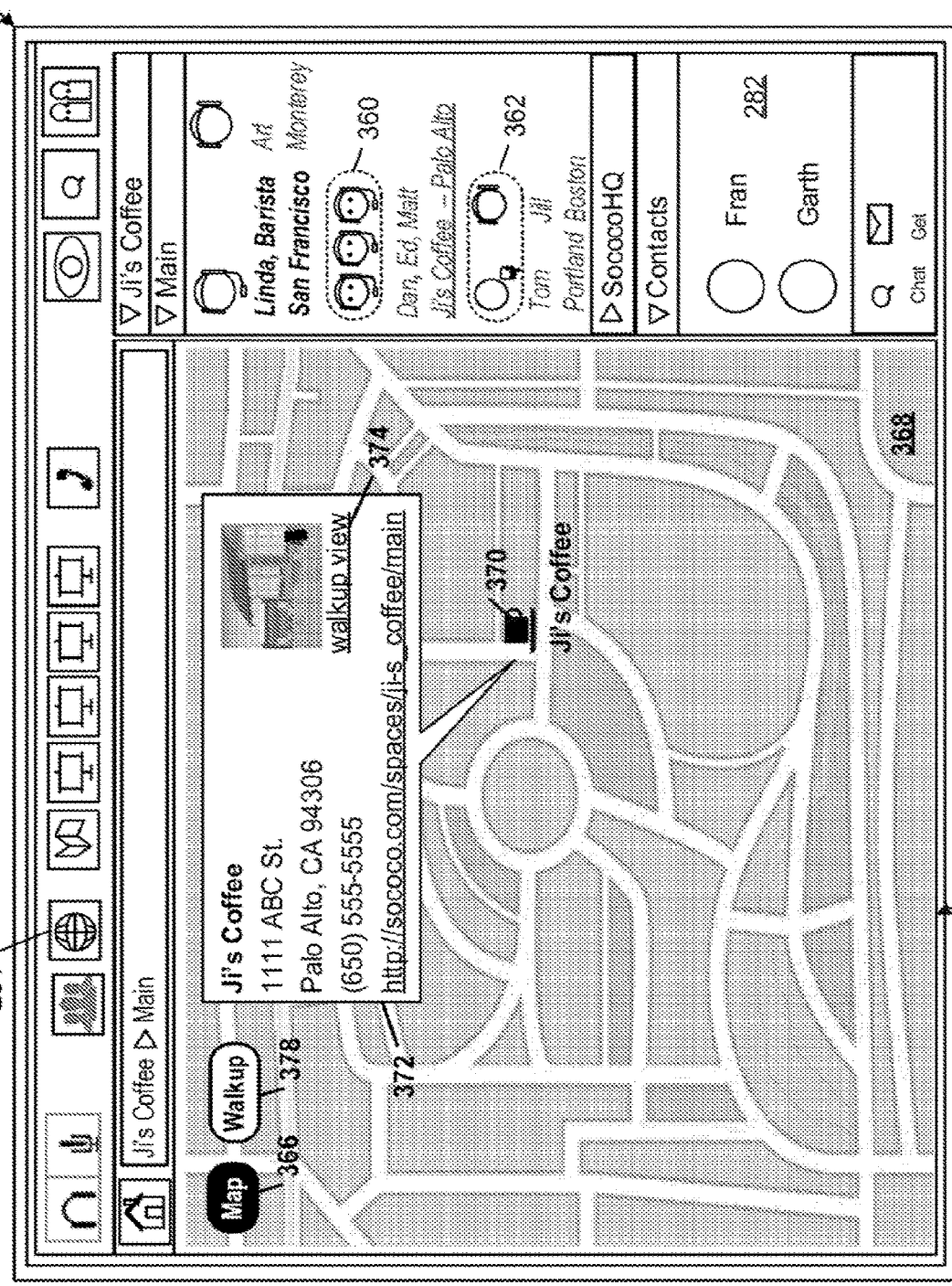
FIG. 10 is a diagrammatic view of an example of a graphical user interface.

Alternatively, by selecting a Map View button 366 in the spatial visualization shown in FIG. 8, the user can change the view mode of the viewer panel 274 from the Virtual Area View mode shown in FIG. 8 to a Map View mode shown in FIG. 10, which presents a spatial visualization 368 of a real world location that is persistently associated with the Ji's Coffee virtual area. In this example, the spatial visualization 368 is a map view showing a virtual representation (i.e., a street map) of a real world geographic area containing a real world building corresponding to the Ji's Coffee virtual area. The real world location of Ji's Coffee is indicated in the map view by a coffee cup icon 370 that suggests a specific type of business (i.e., a coffee shop). A popup window 372 is displayed in response to user selection of the coffee cup icon 370. The popup window 372 presents the name, address, phone number, and a URL that can be selected to navigate to a network resource (e.g., a web page) that is associated with Ji's Coffee. The popup window 372 also includes a navigatable "walkup view" link 374 that allows the user to change the view mode of the viewer panel 274 from the Map view mode shown in FIG. 10 to the Walkup View mode shown in FIG. 11, which shows real world imagery (e.g., a photograph or video images) of a real world geographic area containing a real world building 376 that is associated with the Ji's Coffee virtual area.

Figure 11:
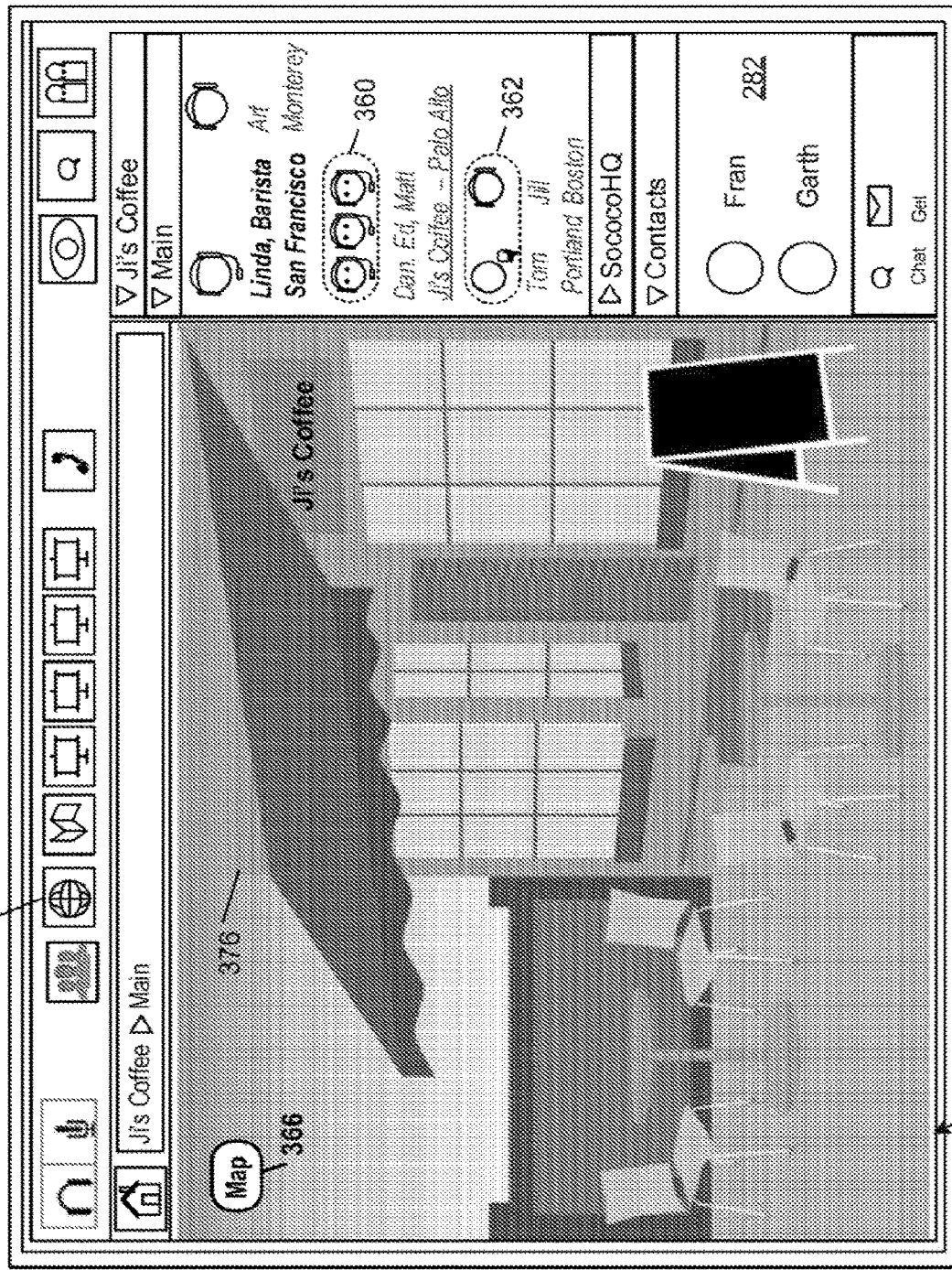
FIG. 11 is a diagrammatic view of an example of a graphical user interface.

The user also can select a Walkup View button 378 in the spatial visualization shown in FIG. 8 to change the view mode of the viewer panel 274 from the Virtual Area View mode shown in FIG. 8 to the Walkup View mode shown in FIG. 11.

In some examples, a user's real world state drives changes in the virtual state of the user or another communicant. For example, a user's real world (absolute or relative) location may drive changes in the virtual state (e.g., real world location based switching of the communicant's virtual location) of the user or another communicant.

Figure 12:
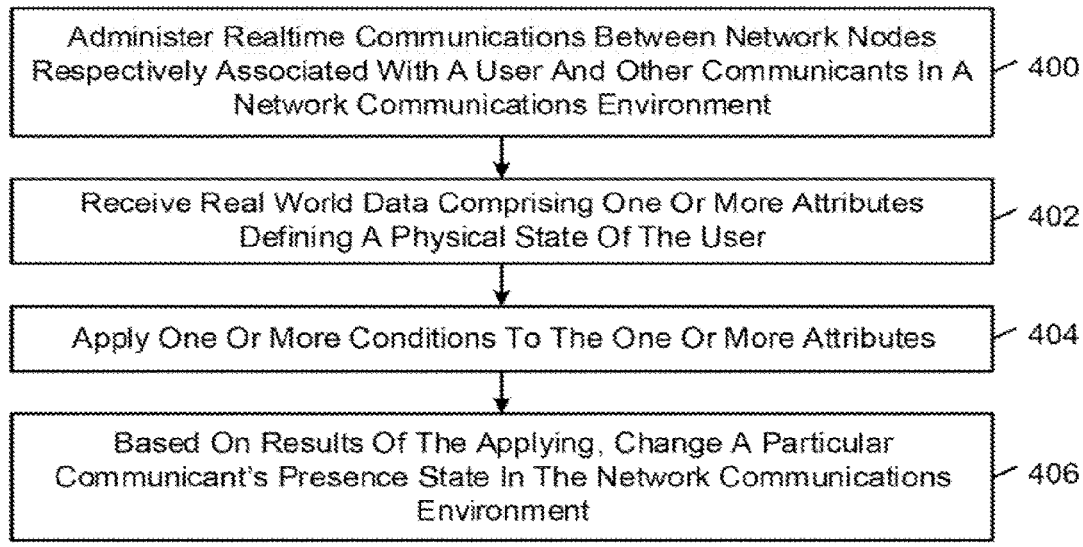
FIG. 12 is a flow diagram of an example of a method.

FIG. 12 shows an example of a method by which the area server platform 18 changes a particular communicant's presence state based on the physical state of a user, where the particular communicant may be the user or another communicant. In accordance with this method, the area server platform 18 administers realtime communications between network nodes respectively associated with a user and other communicants in a network communications environment (FIG. 12, block 400). The area server platform 18 receives real world data that includes one or more attributes that define a physical state of the user (FIG. 12, block 402). The area server platform 18 applies one or more conditions to the one or more attributes (FIG. 12, block 404). Based on results of the applying, the area server platform 18 changes a particular communicant's presence state in the network communications environment (FIG. 12, block 406).

In some examples, the user is the particular communicant whose virtual presence state is changed. In some of these examples, the area server platform 18 establishes a presence for the user in a virtual area based on results of applying the one or more conditions to the one or more attributes defining the user's physical state. In some of these examples, at least one of the one or more attributes defines a real world location of the user, and the area server platform 18 establishes the user's presence in the virtual area based on a determination that the real world location of the user is within a particular physical area. In some cases, the particular physical area is defined in relation to a current real world location of another communicant. In some of these examples, the area server platform 18 establishes the user's presence in the virtual area based on a determination that the user and the other communicant are physically co-present. In some of these examples, the area server platform 18 creates the virtual area for the user and the other communicant based on a determination that the real world locations of the user and the other communicant are physically co-present. In some of these examples, the area server platform 18 terminates the user's presence in a virtual area based on application of one or more conditions to at least one of the one or more attributes defining the user's physical state. For example, in some cases, at least one of the one or more attributes defines a real world location of the user, and the area server platform 18 terminates the presence of the user in the virtual area based on a determination that the user's real world location is outside a particular physical area. In some cases, the particular physical area is defined in relation to a current real world location of another communicant. In some examples, the area server platform 18 terminates the user's presence in the virtual area based on a determination that the real world locations of the user and the other communicant are not physically co-present.

In some examples, the user is not the particular communicant whose virtual presence state is changed. In some of these examples, the area server platform 18 establishes a presence for the particular communicant in a virtual area based on results of applying the one or more conditions to the one or more attributes that define the user's physical state. In some of these examples, at least one of the one or more attributes defines a real world location of the user, and the area server platform 18 establishes the presence of the other communicant in the virtual area based on a determination that the user's real world location is within a particular physical area. In some of these examples, the area server platform 18 terminates the presence of the other communicant in a virtual area based on application of one or more conditions to at least one of the one or more attributes defining the user's physical state. For example, in some cases, at least one of the one or more attributes defines a real world location of the user, and the area server platform 18 terminates the presence of the other communicant in the virtual area based on a determination that the user's real world location is outside the particular physical area.

In the following examples, the virtual area platform 18 changes the presence state of the user or another communicant in the network communications environment based on a determination that the user's real world coordinates satisfy a location-based predicate.

Figures 13, 14:
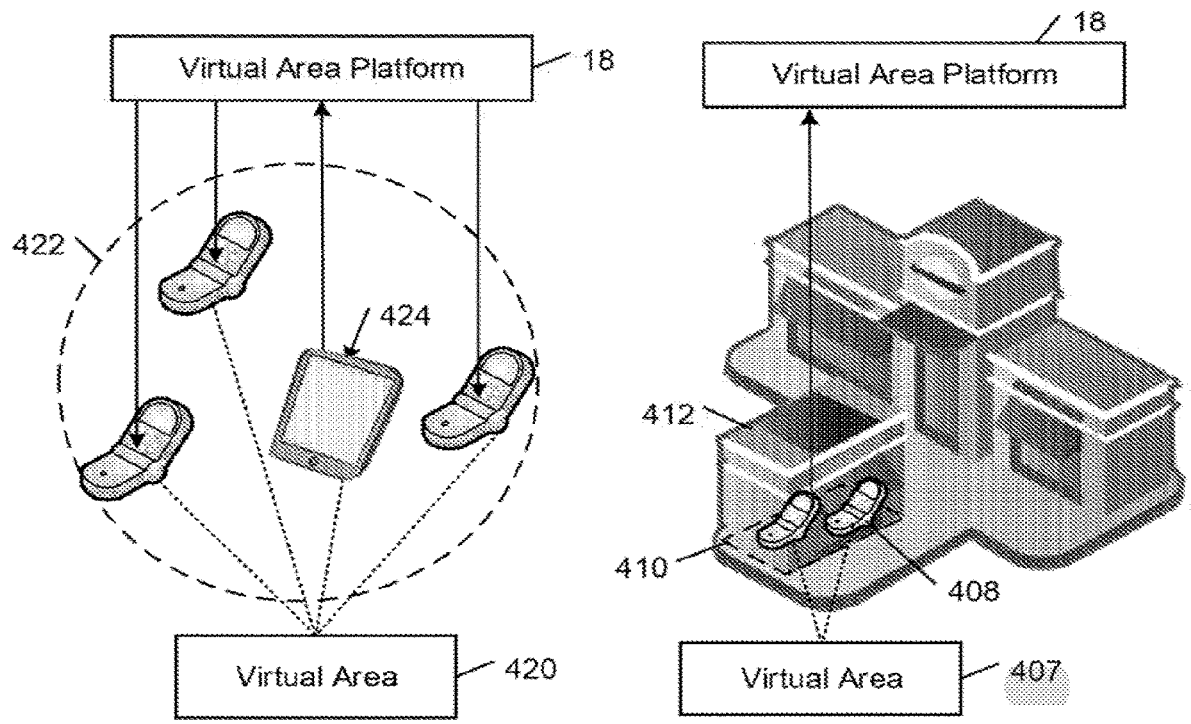
FIG. 13 is a diagrammatic view of an example of an area server platform administering communicant interactions in a virtual area.
FIG. 14 is a diagrammatic view of an example of an area server platform administering communicant interactions in a virtual area.

Referring to FIG. 13, in some examples, the virtual area platform 18 changes the presence state of the user or particular other communicant based on application of a proximity predicate to the user's real world location in relation to the real world locations of one or more other communicants (e.g., the communicants are within a particular distance from one another). In other examples, the virtual area platform 18 changes the presence state of the user or the particular communicant based on a determination that his or her network node is located within a specified distance of a target one of one or more other communicants' network nodes. In some examples, the virtual area platform 18 conditions the change in the presence state of the user or the particular communicant on satisfaction of an optional time predicate (e.g., the communicants must satisfy the proximity predicated for at least a threshold length of time, such as one minute).

In the illustrated example, the virtual area platform 18 changes the presence state of the user or the particular communicant in relation to a virtual area 420 based on the size of the smallest imaginary circular boundary 422 that circumscribes the real world locations of the user's network node (e.g., tablet computer 424) and one or more other communicants' network nodes. For example, if the real world locations of the user's network node and the one or more other network nodes can be circumscribed by an imaginary circular boundary 422 with a diameter of at most a specified threshold length (e.g., three meters), the virtual area platform 18 automatically establishes a presence for the user or the particular communicant in the virtual area 420.

In some cases, the other communicants already are present in the virtual area 420 and the user or the particular communicant automatically are entered into the virtual area 420 when the location of the user's network node 424 in relation to the network nodes of the one or more other communicants satisfies the proximity predicate. In other cases, the virtual area platform 18 automatically creates the virtual area 420 at the time the proximity predicate is satisfied. The virtual area 420 may be a persistent virtual area that is uniquely associated with a particular set of one or more communicants or it may be a transient virtual area that exists only from the time that it is created to the time when all the communicants have left the virtual area, at which point the virtual area is deleted. In some cases, the locations of the user and one or more other communicants may satisfy the proximity predicate while the user is virtually co-present with a particular communicant in a particular virtual area or zone. In some of these cases, the virtual area platform 18 automatically may establish presences for the one or more other communicants in the particular virtual area or zone so that the particular communicant will see the socially relevant fact that the user now is physically co-present with the one or more other communicants. In this way, the physical location of the user drives the virtual presences of the one or more other communicants in the network communications environment (see, e.g., the description below in connection with FIGS. 17A-17B).

In some examples, the area server platform 18: associates a virtual area with a particular real world location; ascertains a user's current real world location over time; determines whether the current real world location of the user coincides with the particular real world location; and based on a determination that the current real world location of the user coincides with the particular real world location, automatically connects the user to the virtual area platform 18, which supports realtime communications between communicants in the virtual area.

FIG. 14 shows an example in which the virtual area platform 18 changes the virtual presence state of the user or particular other communicant based on the physical location of the user's network node in relation to a designated real world area. In the illustrated example, the virtual area platform 18 changes the virtual presence state of the user or the particular communicant with respect to a virtual area 407 based on the location of the user's network node (e.g., mobile phone 408) in relation to a specified real world coordinate boundary 410 within a real world building 412. In some examples, if the user's network node 408 is within the coordinate boundary 410, the virtual area platform 18 establishes a presence for the user or the particular communicant in the virtual area 407 that is associated with the coordinate boundary 410. In some examples, if the user's network node 408 is outside the coordinate boundary 410, the virtual area platform 18 terminates the virtual presence of the user or the particular communicant in the virtual area 407.

In the example shown in FIG. 14, the virtual area 407 is associated with the physical space demarcated by the coordinate boundary 410. The physical space may correspond to the physical location of a business establishment (e.g., an office building, a retail store, such as a coffee shop or a department store, a restaurant, sports bar, social club, athletic club, or sports and exhibition facility) and the virtual area 407 may be a virtual area that is associated with the business establishment. In some of these examples, the physical location of the user in relation to the coordinate boundary 410 drives the user's virtual presence in the associated virtual area 407. In some of these cases, when the user enters the business establishment, she automatically enters the virtual area 407, allowing her to seamlessly interact both physically with the communicants who are in the physical retail store and virtually with the communicants who are in the associated virtual area 407. Similarly, when the user leaves the business establishment, she automatically leaves the virtual area 407.

In other examples, the physical location of the user in relation to the coordinate boundary 410 drives another communicant's virtual presence in the associated virtual area 407. In some of these cases, while being virtually co-present with a particular communicant in a particular virtual area or zone, the user may enter the physical space demarcated by the coordinate boundary 410 and thereby become physically co-present with one or more other communicants in the physical space. In these cases, the virtual area platform 18 automatically may establish presences for the one or more other communicants in the particular virtual area or zone so that the particular communicant will see the socially relevant fact that the user now is physically co-present with the one or more other communicants (see, e.g., the description below in connection with FIGS. 16A-16B).

Figure 15A:
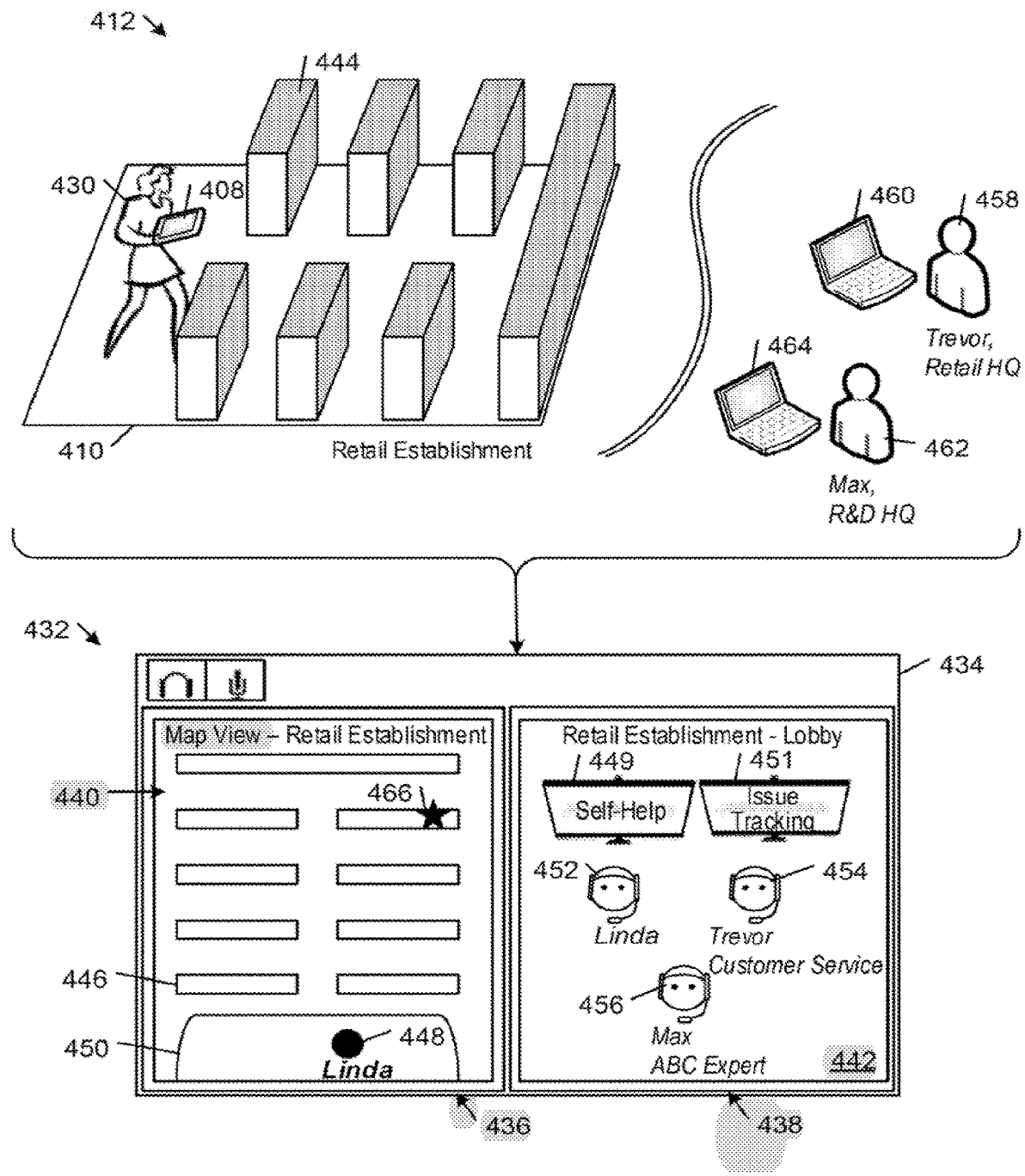
FIG. 15A is a diagrammatic view of an example of a physical area and an example of a graphical user interface.

FIG. 15A shows an example in which a user 430 (Linda) enters a retail establishment of a retailer. The retail establishment is demarcated by the coordinate boundary 410 in the building 412 shown in FIG. 14. In this example, when the user's network node 408 enters the physical area circumscribed by the coordinate boundary 410, the virtual area platform 18 automatically establishes a presence for the user 430 in the virtual area 407. This is reflected in a graphical user interface 432 that is generated in a window 434 on a display by a virtual area enabled communications application running on the user's network node 408. The graphical user interface 432 includes a first viewer panel 436 that shows a Map View 440 of the retail establishment, and a second viewer panel 438 that shows a spatial visualization of a lobby zone 442 of the virtual area 407. In some examples, the Map View 440 and the spatial visualization 442 are rendered views that are specified in the virtual area application defining the virtual area 407.

In the first viewer panel 436, the Map View 440 shows a two-dimensional graphical floor plan showing graphical representations of the layout of aisles and rows between shelves 444 in the retail establishment. In the Map View 440, the shelves 444 are represented graphically by rectangles 446. Communicants who have been detected as being physically present in the retail establishment are represented by respective avatars in the first viewer panel 436. In the illustrated example, the user 430 has been detected as being present in the lobby of the retail establishment and therefore is represented by circular sprite 448 in a graphical representation 450 of the lobby of the retail establishment.

In the second viewer panel 438, the spatial visualization shows the user's current zone of presence (i.e., the lobby zone 442) of the virtual area 407. In the illustrated example, the lobby zone is represented graphically by a two-dimensional top view of a rectangular space that contains two viewscreen objects 449, 451, and a respective avatar 452, 454, 456 for each of the communicants who is present in the lobby zone 442. In this example, the avatar 452 represents the user 430, the avatar 454 represents a communicant 458 (Trevor) who is operating a remote network node 460, and the avatar 456 represents a communicant 462 (Max) who is operating a remote network node 464. The communicant 458 is a customer service representative who is physically located in the retail department headquarters (Retail HQ) of the retailer, and the communicant 462 is an expert in the ABC department who is physically located in the research and development headquarters (R&D HQ) of the retailer. Graphical user interfaces analogous to the graphical user interface 432 are respectively generated by virtual area enabled communications applications running on the communicants' network nodes 460, 464.

In the illustrated example, the viewscreen object 449 is linked to network-based self-help resources (e.g., online resources for identifying products, checking product availability, comparing different products, submitting queries to and receiving query responses from a knowledgebase, and specific self-help content, such as user guides, and FAQs) that provide information that might help the user 430 to resolve an issue without requiring the assistance of a customer service representative or an expert. If the user 430 cannot resolve an issue using the self-help resources, the user 430 can select the viewscreen object 451 to interact with an issue tracking system that manages and maintains lists of issues. The customer may request a new ticket or enter the identifier of a ticket that already has been issued to the customer. In response, the issue tracking system may create or update reported customer issues, and update an issue tracking database accordingly. The ticket is used to track the issue, and potentially to schedule support for the customer's issue. After a ticket has been created, a customer service person (e.g., communicant 458, Trevor) who designated for providing first tier support and is available to discuss the ticket with the customer (e.g., using audio, video, and/or chat) typically joins the user 430 in the lobby to discuss the issue. The customer service person may be able to resolve the issue or escalate the customer to an expert (e.g., communicant 462, Max) for assistance. If escalated, the expert may join the user 430 in the lobby when he is available to discuss the issue with the user 430. The user may browse the retail establishment while waiting for the customer service representative or the expert in the virtual lobby zone 442.

In the process of resolving the issue, the user 430 may interact with one or both of the customer service representative 458 and the expert 462 in the virtual lobby zone 442 over one or more realtime audio, video, text chat, application sharing, and file sharing communication channels. If a particular product is identified, one of the customer service representative 458 and the expert 462 may assist the user 430 in locating the product on the shelves 444 of the physical retail establishment. For example, one of the communicants 458, 462 may interact with the virtual area platform 18 to cause the location of the product to be indicated by a star icon 466 in the Map View 440 shown in the first viewer panel 436 of the user's graphical user interface 434. Using the Map View 440 as a guide, the user 430 may then navigate to the real world location of the product of the product in the retail establishment. In some examples, the virtual area platform 18 tracks the user's position in the retail establishment (e.g., using one or more of the communicant locating techniques described above) and moves the user's sprite 448 to the locations of the Map View 440 corresponding to the real world locations of the user 430, thereby visually guiding the user to the location 466 of the desired product. In some of these examples, the virtual area platform 18 provides step-by-step directions from the user's current real world location to the real world location 466 of the desired product, where the directions may be presented to the user 430 in the form of a text-based list or synthesized speech.

Figure 15B:
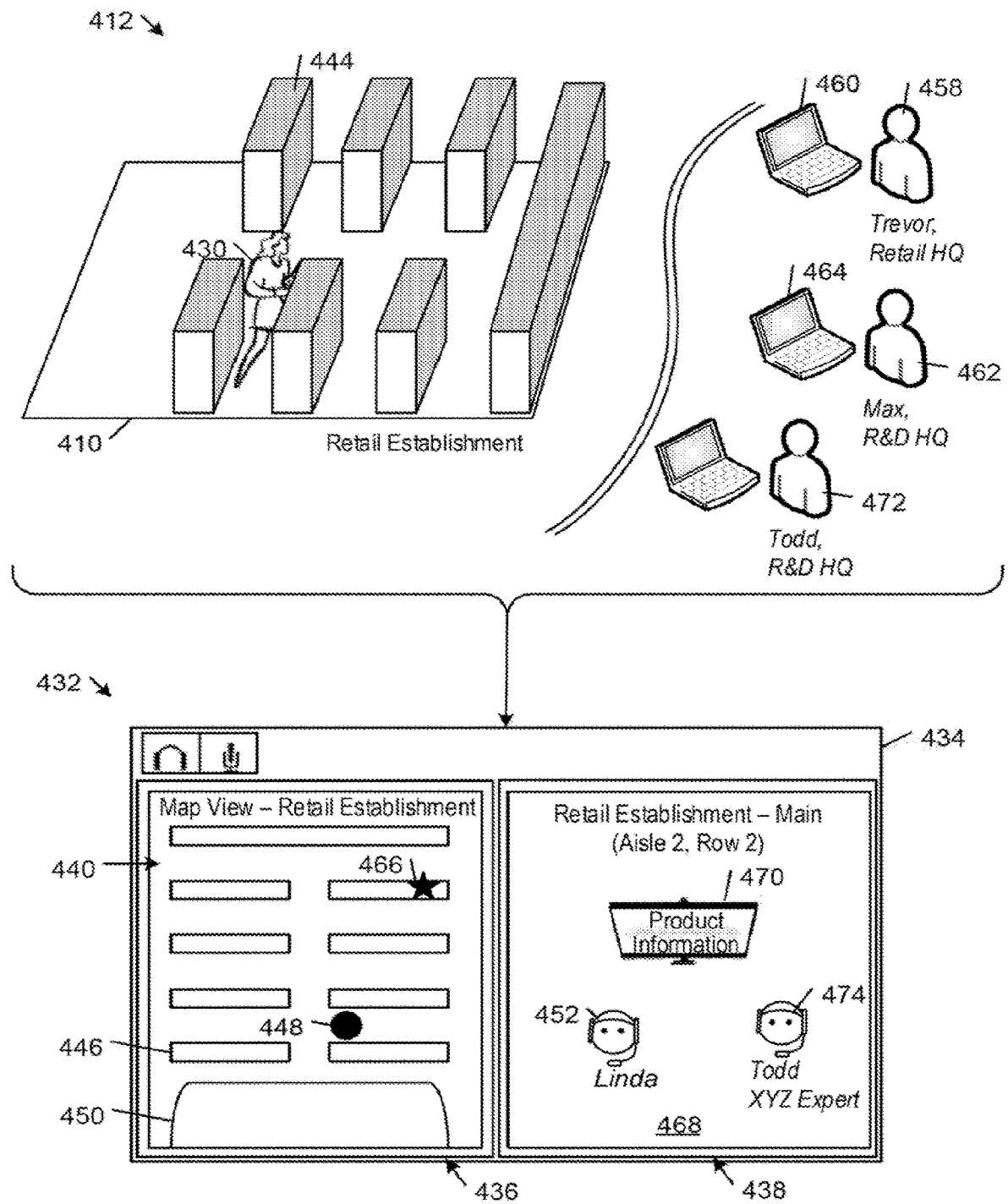
FIG. 15B is a diagrammatic view of an example of a physical area and an example of a graphical user interface.

Referring to FIG. 15B, various virtual area extensions are activated as the user moves about the retail establishment. In the illustrated example, the physical area is divided into non-overlapping and non-rendered sections that are designated by respective aisle and row coordinates (e.g., aisle 2, row 2). Each of the sections is associated with a respective section zone within the Main zone 442 of the virtual area 407. Each section zone is associated with viewscreen object and a respective set of switching rules that allows realtime audio, chat, and application sharing communications between communicants in the same section zone. In the illustrated example, when the user enters the Aisle 2, Row 2 section of the real world retail establishment, the virtual area platform 18 automatically moves the user's avatar 452 into the associated Aisle 2, Row 2 section zone 468 of the Main zone of the virtual area 407. The Aisle 2, Row 2 section zone 468 includes a viewscreen object 470 that is associated with a URI link that references a network resource providing information about the products carried on the shelves in the Aisle 2, Row 2 section of the real world retail establishment (e.g., list of products, inventories, pricing, product comparisons, promotions, advertising, and resources for ordering products online).

In some examples, when the user 430 enters a particular one of the sections of the retail establishment, the virtual area platform 18 automatically notifies a relevant retail establishment employee (e.g., a customer service representative or an expert) who is available to join the user 430 in the associated section zone of the virtual area 407. In the illustrated example, in response to a notification received from the virtual area platform 18, a communicant 472 (Todd, who is an expert regarding the products offered in the Aisle 2, Row 2 section of the retail establishment) has moved his avatar 474 into in the Aisle 2, Row 2 section zone 468 of the virtual area 407 in order to offer his assistance to the user.

In the example shown in FIGS. 15A-15B, upon entering the physical space of the retail establishment or a section thereof, the user 430 not only can obtain immediate access to self-help and other network-based resources, but also can communicate with one or more people over one or more realtime communication channels to obtain general assistance or expert technical support and advice no matter where those people are located in the real world. Since the physical locations of the support personnel are not constrained to be in the retail establishment, the retailer is free to staff its real world retail establishments with lower levels of support and specialized expertise or none at all. In addition, the retailer also is able to extend the support and specialized expertise that is available across different geographic areas to increase the efficiency and responsiveness of its customer support operations.

As explained above, the physical location of the user also may drive another communicant's virtual presence in a virtual area.

Figure 16A:
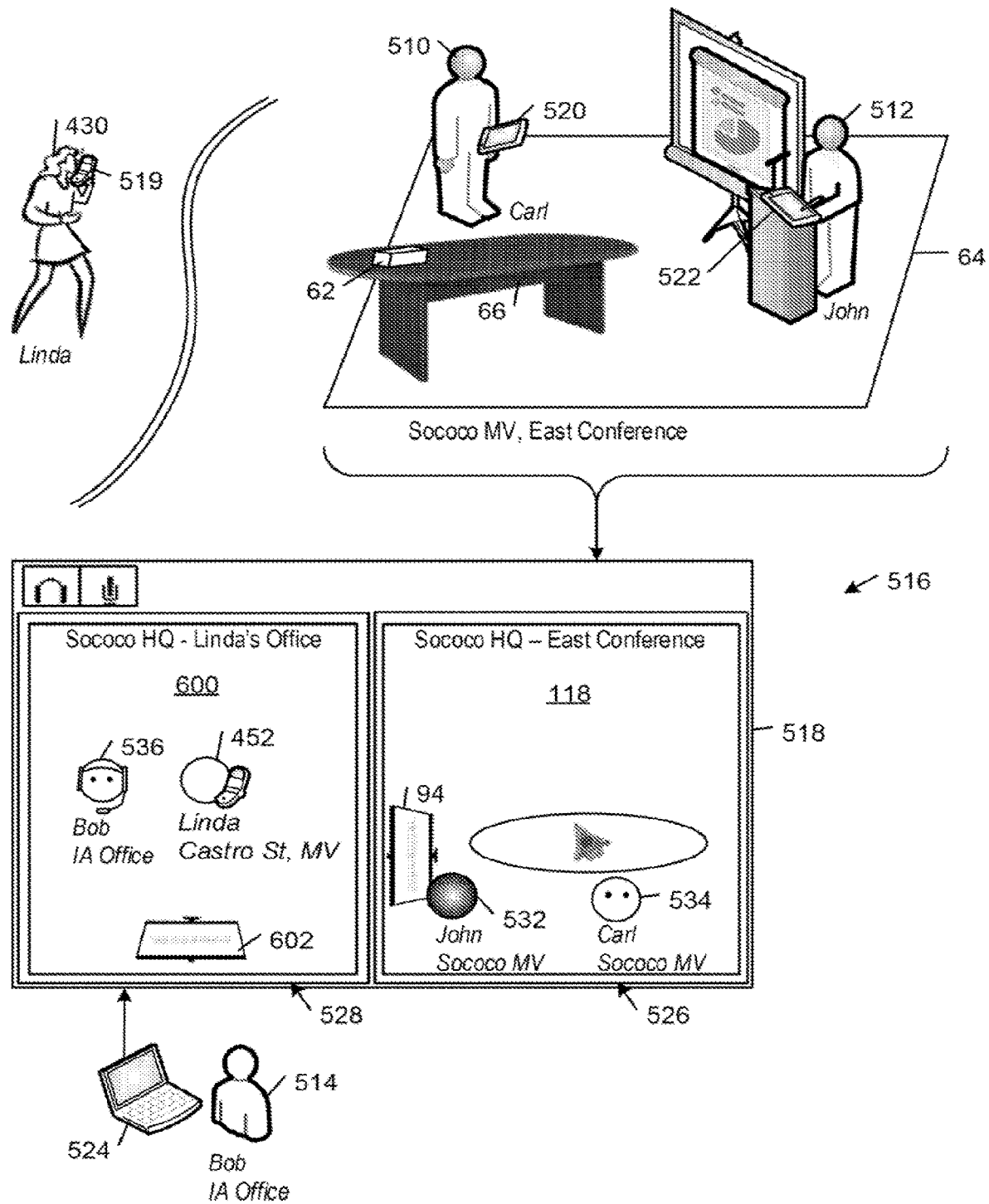
FIG. 16A is a diagrammatic view of an example of a physical area and an example of a graphical user interface.

FIG. 16A shows an example in which the user 430 (Linda) and another communicant 514 (Bob) are co-present in Linda's Office zone 600 of the SococoHQ virtual area 200, and two other communicants 510, 512 (Carl, John) are co-present in the East Conference zone 118 of the SococoHQ virtual area 200 (shown in FIG. 4). The communicants 430, 510-514 are operating respective network nodes 519-524 (e.g., mobile computers, such as laptop computers, tablet computers, and mobile phones). The network nodes 520-524 run respective virtual area enabled communications applications that establish respective presences for the communicants 510-512 in respective zones of the SococoHQ virtual area 200. Linda's presence in Linda's Office zone 600 is established either by using her network node 519 to call a specific dial-in telephone number that is associated with Linda's Office zone 600 or receive a telephone call from a communicant in Linda's Office zone 600 in connection with a telephony object (not shown) in the Linda's Office zone 600. The virtual presence apparatus 62 is logged into the East Conference zone 118 and interfaces the two communicants 510, 512 in the physical space 64 with the East Conference zone 118 by, for example, transceiving realtime communications and other data (e.g., location data and co-presence data) between the East Conference zone 118 and the physical space 64. In some examples, the audio sources and sinks of the client network nodes 530-522 are turned off either automatically by the virtual area platform 18 or manually by the communicants 510-512 in order to avoid echo and other audio artifacts that otherwise might occur as a result of being interfaced with the East conference zone 118 concurrently by the virtual presence apparatus 62 and their respective network nodes 520, 522.

Linda 430 currently is located on Castro Street in Mountain View, California, Carl 510 and John 512 are located in in the real world East Conference room of the Sococo Headquarters located in the building 112 in Mountain View, California, and Bob 514 is located in his home office in Iowa. The real world locations of the communicants 430, 510-512 are reflected in a graphical user interface 516 that is generated in a window 518 on a display by a virtual area enabled communications application running on the Carl's network node 520. (Graphical user interfaces analogous to the graphical user interface 432 are respectively generated by virtual area enabled communications applications running on the other communicants' network nodes 522-524.) The graphical user interface 516 includes a first viewer panel 526 and a second viewer panel 528. The first viewer panel 526 shows a spatial visualization of the East Conference zone 118 and the second viewer panel 528 shows a spatial visualization of Linda's Office zone 600. In the illustrated example, each of the East Conference zone 118 and Linda's Office zone 600 is represented graphically by a respective two-dimensional top view of a rectangular space that contains the viewscreen object 94, 602, and a respective avatar 452, 532, 534, 536 for each of the communicants who is present in lobby zone. In this example, the avatar 452 represents the user 430 (Linda), the avatar 532 represents the communicant 510 (Carl), the avatar 534 represents the communicant 512 (John), and the avatar 536 represents the communicant 514 (Bob). Each of the avatars 452, 532-536 is associated with a respective status line that includes the name of the communicant and his or her current real world location.

Figure 16B:
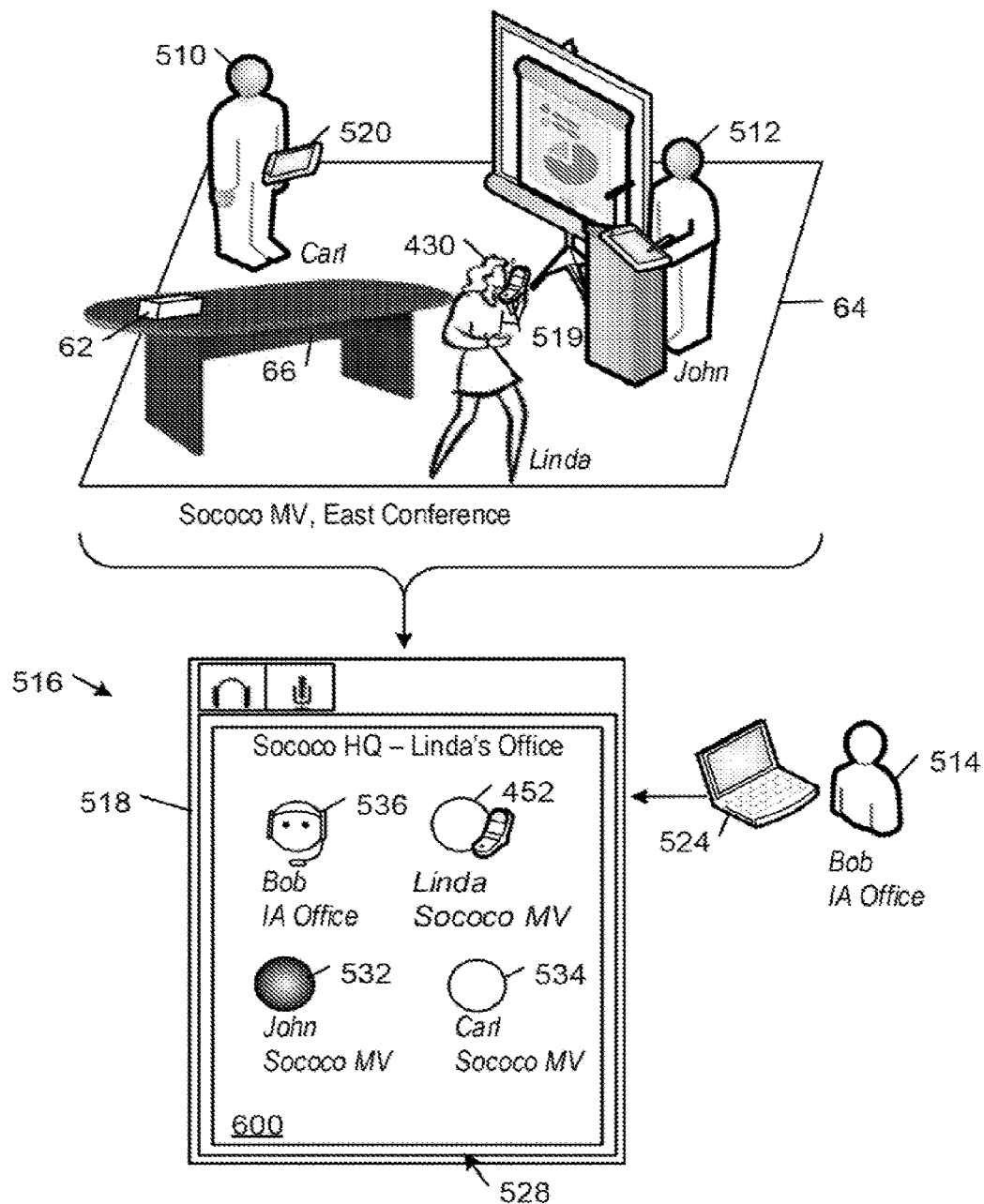
FIG. 16B is a diagrammatic view of an example of a physical area and an example of a graphical user interface.

In some examples, while being virtually co-present with Bob 514 in Linda's Office zone 600, Linda 430 may enter the real world East Conference room 64 and thereby become physically co-present with Carl 510 and John 512. In these examples, in response to a determination that Linda is co-present with Carl 510 and John 512 in the physical space 64, the virtual area platform 18 automatically establishes presences for Carl 510 and John 512 in Linda's Office zone 600 so that Bob will see the socially relevant fact that Linda now is physically co-present with Carl 510 and John 512. In some examples, the virtual area platform 18 determines Linda's arrival in the East Conference room 64 based on comparison of location-based services information (e.g., GPS data) received from Linda's network node 519 with a known location of the East Conference room 64. In other examples, the virtual presence apparatus 62 detects the physical presence of Linda and sends information to the virtual area platform 18 that can be used to identify Linda. FIG. 16B shows the East Conference room 64 and the spatial visualization of Linda's Office zone 600 after Linda has arrived at the East Conference room 64, and the virtual area platform 18 has established respective presences for Carl 510 and John 512 in Linda's Office zone 600.

After Linda has entered the real world East Conference room 64, the virtual area platform 18 determines whether to establish Linda's presence in the virtual counterpart East Conference zone 118 or maintain Linda's presence in Linda's Office zone 600. In the illustrated example, the virtual area platform 18 is configured to maintain Linda's current virtual location of presence so long as she is virtually co-present with at least one other communicant in that location; otherwise, the virtual area platform 18 will move Linda's current virtual location of presence from Linda's Office zone 600 to the virtual location associated with her new physical location of presence. In the illustrated example, Linda and Bob still are co-present in Linda's Office zone 600 at the time Linda enters the real world East Conference room 64, therefore the virtual area platform 18 establishes a presence for Linda in the East Conference zone 118 and maintains her presence in Linda's Office zone 600. The virtual area platform 18 also is configured to inform a communicant who is virtually co-present with another communicant when the other communicant is physically co-present with one or more communicants. Thus, in the illustrated example, the virtual area platform 18 automatically establishes a virtual presence for Carl 510 and John 512 in Linda's Office zone 600 when Linda becomes physically co-present with them in the East Conference room 64. This is reflected in the second viewer panel 528 in the graphical user interface 516 shown in FIG. 16B.

The functionality associated with the communicant presences that are established as a result of the change in Linda's physical co-presence state is configurable.

In some examples, the virtual area platform 18 merely depicts dummy (or placeholder) avatars representing Carl 510 and John 512 into Linda's Office zone 600 in order to merely inform the remote communicant (Bob 514) that Linda now is physically co-present with Carl and John. In these examples, Carl 510 and John 512 cannot control the dummy avatars nor can they receive any communications from Linda's Office zone 600 (e.g., the virtual area platform 18 may automatically mute audio communications associated with the dummy avatars); instead, the virtual area platform 18 simply notifies Carl 510 and John 512 that respective passive presences have been established for them in Linda's Office zone 600. In some of these examples, the virtual area platform 18 may include with the notification a navigatable URI link that references Linda's Office zone 600 and thereby allows Carl 510 and John 512 to formerly join Linda 430 and Bob 514 in Linda's Office zone 600.

In other examples, the virtual area platform 18 automatically establishes fully functional presences for Carl 510 and John 512 in the East Conference zone 118 when Linda 430 becomes physically co-present with them in the East Conference room 64. In some of these examples, the virtual area platform 18 moves the presences of Carl 510 and John 512 from the East Conference zone 118 to Linda's Office zone 600, whereas in other examples, the virtual area platform 18 maintains presences for Carl 510 and John 512 in both the East Conference zone 118 and Linda's Office zone 600.

Figure 17A:
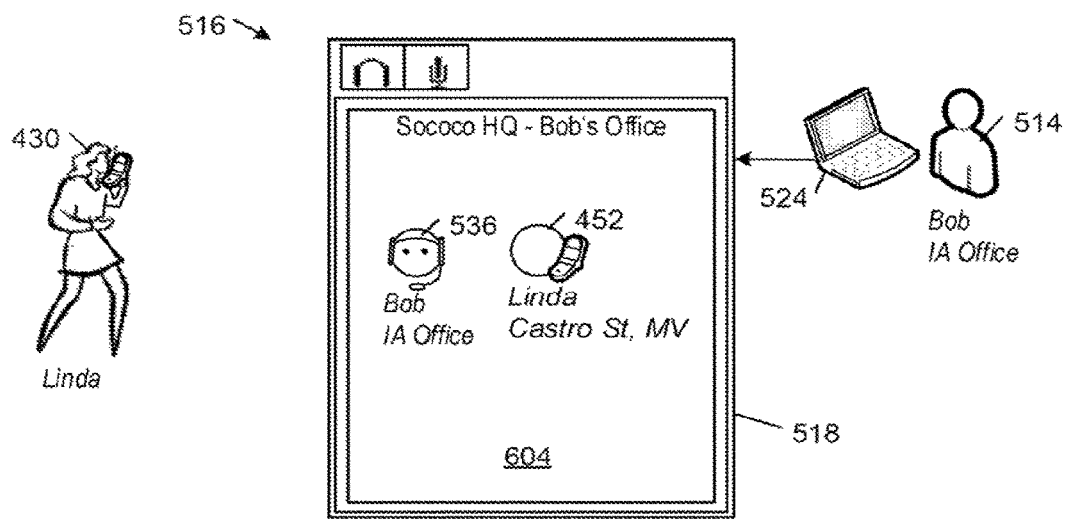
FIG. 17A is a diagrammatic view of an example of a graphical user interface showing interactions between communicants in a virtual area.
Figure 17B:
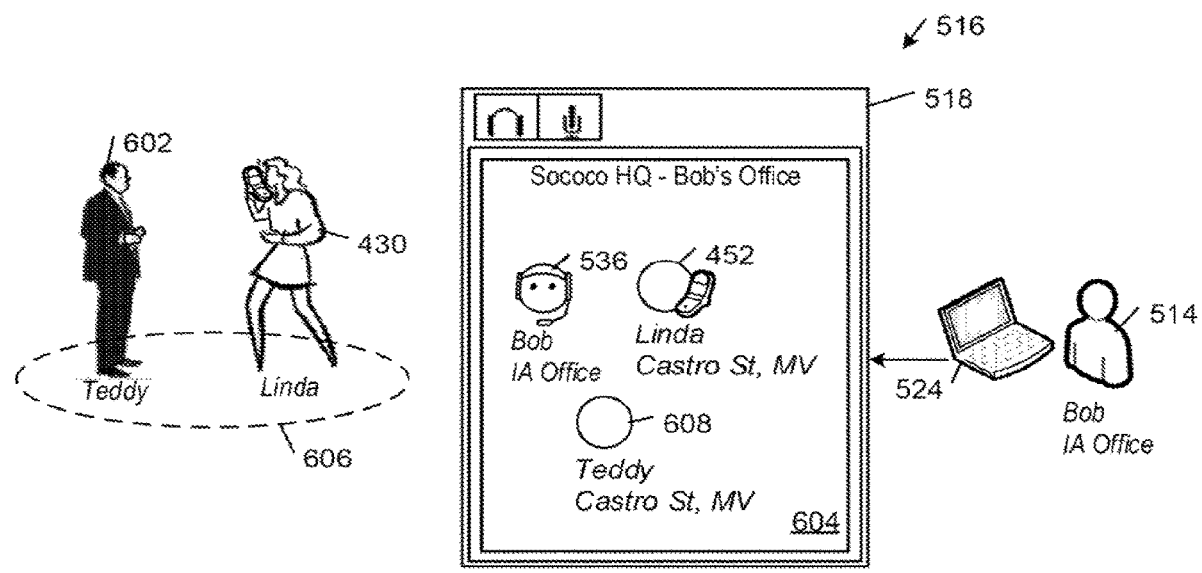
FIG. 17B is a diagrammatic view of an example of a graphical user interface showing interactions between communicants in a virtual area.

FIGS. 17A and 17B show an example in which Linda 430 and Bob 514 are virtually co-present in Bob's Office zone 604 of the SococoHQ virtual area 200 (see FIG. 17A) and, subsequently, and another communicant (Teddy 602) becomes physically co-present with Linda 430 by satisfying a proximity predicate 606 (see FIG. 17B). In this example, in response to a determination that the real world locations of Linda 430 and Teddy 602 satisfy the co-presence proximity predicate 606 (see the discussion above in connection with FIG. 13), the virtual area platform 18 automatically establishes a presence for Teddy 602 (as represented by an avatar 608) in Bob's Office zone 604 so that Bob 536 will see the socially relevant fact that Linda 430 now is physically co-present with Teddy 602. In this way, Linda's physical location drives the virtual presences of Teddy 602 in the network communications environment 10.

In some examples, a user's physical state drives the communications connections between the user and one or more other communicants in a virtual area.

Figure 18:
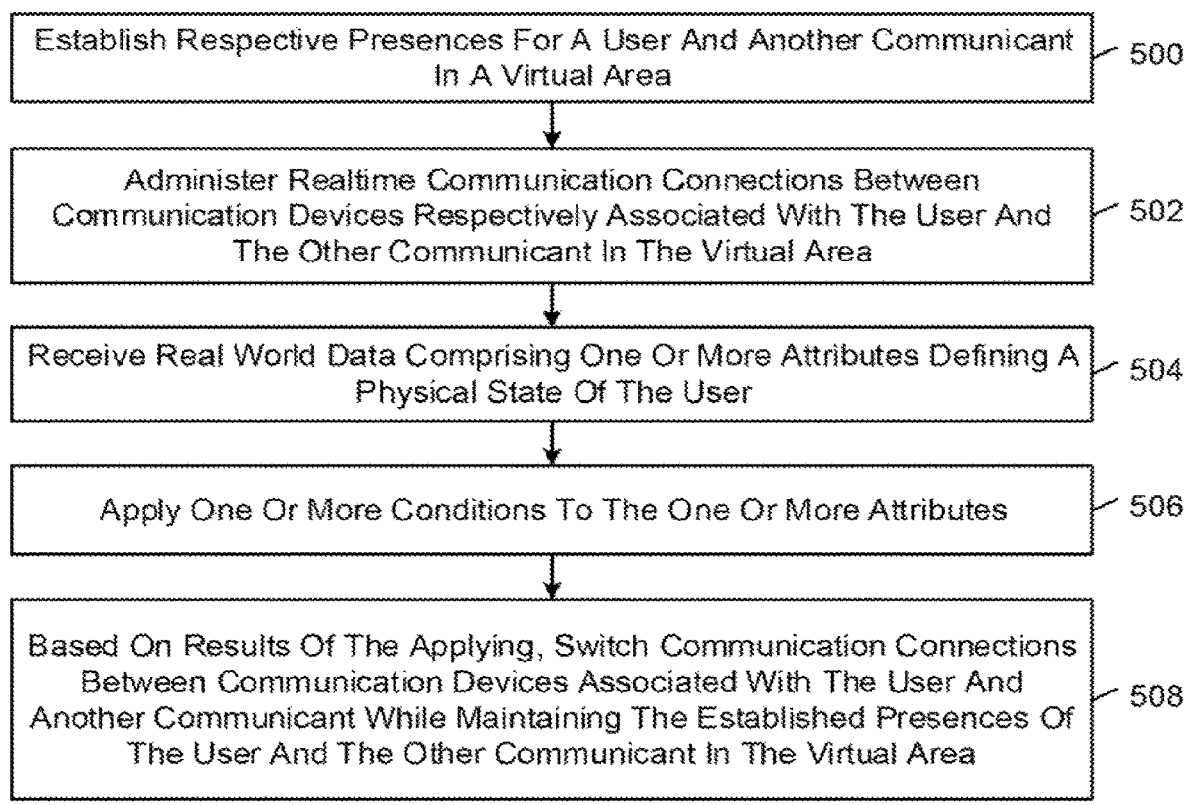
FIG. 18 is a flow diagram of an example of a method of switching communication connections between communication devices.

FIG. 18 shows an example of a method by which the virtual area platform 18 switches communications connections between a user and one or more other communicants based on the user's physical state. In accordance with this method, the virtual area platform 18 establishes respective presences for a user and another communicant in a virtual area (FIG. 18, block 500). The virtual area platform 18 administers realtime communication connections between communication devices respectively associated with the user and the other communicant in the virtual area (FIG. 16, block 502). The virtual area platform 18 receives real world data comprising one or more attributes defining a physical state of the user (FIG. 18, block 504). The virtual area platform 18 applies one or more conditions to the one or more attributes (FIG. 18, block 506). Based on results of the applying, the virtual area platform 18 switches communication connections between communication devices associated with the user and another communicant while maintaining the established presences of the user and the other communicant in the virtual area (FIG. 18, block 508).

In some examples, at least one of the one or more attributes defines a real world location of the user. In some of these examples, the virtual area platform 18 administers a first communication connection between a first communication device associated with the user and a particular communication device associated with the other communicant and, based on results of applying one or more of the conditions to the real world location of the user, the virtual area platform 18 terminates the first communication connection and administers a second communication connection between a second communication device associated with the user and the particular communication device associated with the other communicant. In some cases, the first communication connection is terminated and the second communication connection is administered based on a determination that the real world location of the user coincides with a particular physical area. The first communication device may be, for example, a mobile communication device associated with the user, and the second communication device is in the particular physical area (e.g., a real world conference room) and is associated with the user when the user is in the particular physical area. The virtual area platform 18 typically associates the second communication device with the physical area (e.g., by storing a record in a database). In some cases, the virtual area platform 18 associates the second communication device with the user based on the determination that the real world location of the user coincides with the particular physical area. In some examples, after the first communication connection is terminated, the virtual area platform 18 administers a second communication connection between the first communication device and the particular communication device based on a determination that the real world location of the user is outside a particular physical area.

In some examples, the user's presence in the virtual area is established based on application of one or more of the conditions to at least one of the one or more attributes defining a physical state of the user. In some of these examples, at least one of the one or more attributes defines a real world location of the user, and the virtual area platform 18 establishes the user's presence in the virtual area based on a determination that the user's real world location coincides with a particular physical area. In some examples, the virtual area platform 18 associates the virtual area with the particular physical area. In some of these examples, the particular physical area is defined in relation to a current real world location of the other communicant. In some examples, the virtual area platform 18 establishes the user's presence in the virtual area based on a determination that the user and the other communicant are physically co-present. In some of these examples, the virtual area platform 18 creates the virtual area for the user and the other communicant based on a determination that the user and the other communicant are physically co-present.

In some examples, the virtual area platform 18 terminates the presence of the user in the virtual area based on application of one or more conditions to at least one of the one or more attributes that define the user's physical state. In some of these examples, the at least one attribute defines a real world location of the user, and the virtual area platform 18 terminates the user's presence in the virtual area based on a determination that the real world location of the user is outside a particular physical area. In some cases, the particular physical area is defined in relation to a current real world location of the other communicant. In some examples, the virtual area platform 18 terminates the user's presence in the virtual area based on a determination that the real world locations of the user and the other communicant are not physically co-present in the particular physical area.

In some examples, the virtual area platform 18 receives from the user a request to navigate out of the virtual area and, responsive to the request, terminates the user's presence in the virtual area and terminates the communication connection between the communication devices associated with the user and the other communicant.

Figure 19A:
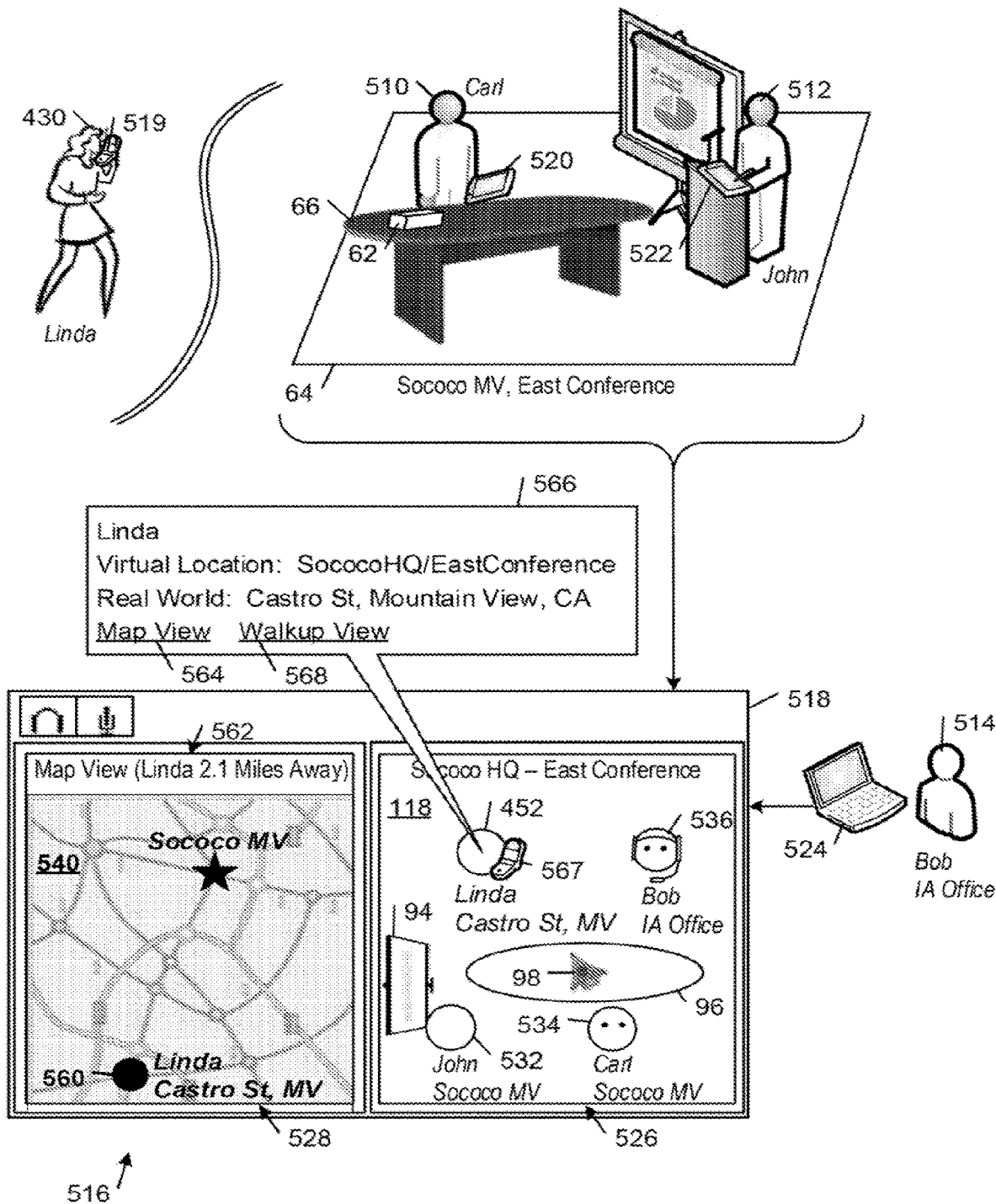
FIG. 19A is a diagrammatic view of an example of a physical area and an example of a graphical user interface.

FIG. 19A shows an example in which the user 430 (Linda) and three other communicants 510, 512, 514 (Carl, John, Bob) are co-present in the East Conference zone 118 of the SococoHQ virtual area 200 (see, e.g., FIG. 4). The communicants 430, 510-512 are operating respective network nodes 519-524 (e.g., mobile computers, such as laptop computers, tablet computers, and mobile phones). The network nodes 520-524 are able to run respective virtual area enabled communications applications that are able to establish respective presences for the communicants 510-512 in East Conference zone 118. Linda's presence in the East Conference zone 118 is established either by using her network node 519 to call a specific dial-in telephone number that is associated with the East Conference zone 118 or receive a telephone call from a communicant in the East Conference zone 118 in connection with a telephony object in the East Conference zone 118. In the illustrated example, the telephony object is incorporated into the virtual presence apparatus 62. The virtual presence apparatus 62 is logged into the East Conference zone 118 and interfaces the two communicants 510, 512 in the physical space 64 with the East Conference zone 118 by, for example, transceiving realtime communications and other data (e.g., location data and co-presence data) between the East Conference zone 118 and the physical space 64. In some example, the audio sources and sinks of the client network nodes 530-522 are turned off either automatically by the virtual area platform 18 or manually by the communicants 510-512 in order to over echo and other audio artifacts that otherwise might occur as a result of being interfaced with the East conference zone 118 by the virtual presence apparatus 62.

Linda currently is located on Castro Street in Mountain View, California, Carl and John are located in in the real world East Conference room of the Sococo Headquarters located in the building 112 in Mountain View, California, and Bob is located in his home office in Iowa. The real world locations of the communicants 430, 510-512 are reflected in a graphical user interface 516 that is generated in a window 518 on a display by a virtual area enabled communications application running on the Carl's network node 520. (Graphical user interfaces analogous to the graphical user interface 516 are respectively generated by virtual area enabled communications applications running on the other communicants' network nodes 522-524.)

The graphical user interface 516 includes a first viewer panel 526 and a second viewer panel 528.

The first viewer panel 526 shows a spatial visualization 442 of the Carl's current zone of presence (i.e., the East Conference zone 118 of the SococoHQ virtual area 200). In the illustrated example, the East Conference zone 118 is represented graphically by a two-dimensional top view of a rectangular space that contains the viewscreen object 94, and a respective avatar 452, 532, 534, 536 for each of the communicants who is present in lobby zone. In this example, the avatar 452 represents the user 430, the avatar 532 represents the communicant 510 (Carl), the avatar 534 represents the communicant 512 (John), and the avatar 536 represents the communicant 514 (Bob). Each of the avatars 452, 532-536 is associated with a respective status line that includes the name of the communicant and his or her current real world location.

The second viewer panel 528 shows a Map View 540 of Linda's current real world location in relation to a target destination. In the Map View 540, Linda is represented by a circular sprite 560 that is positioned at a location in the Map View 540 that corresponds to her current real world location. The Map View also includes a title bar 562 that labels the view as "Map View" and presents the distance between Linda's current real world location and a target destination and optionally an estimate of the current time (e.g., absolute time or a differential time) when Linda is expected to arrive at the target destination. In the illustrated example, the target destination is the real world location of the physical counterpart (i.e., the real world East Conference room 64) to Linda's current location of virtual presence (i.e., the East Conference zone 118 in the SococoHQ virtual area). Information about a particular communicant's current real world location and expected time of arrival at a particular target destination is particularly useful in contexts (e.g., meetings, appointments) in which the physical presence of the particular communicant is required.

In the example shown in FIG. 19A, the Map View 440 is displayed in response to Carl's selection of a Map View control 564 in a person card 566 that is displayed in response to Carl's selection of Linda's avatar 452. In addition to the Map View control 564, the person card 566 also shows the selected communicant's name, current virtual location, current real world location, and a Walkup View control 568 that causes the virtual area enabled communications application running on the Carl's network node 520 to present in the second viewer panel 528 a walkup view of Linda's current real world location (as an example, see the walkup view shown in the viewer panel 274 of the graphical user interface 270 shown in FIG. 11).

The virtual area platform 18 establishes a presence for the user (Linda) in the East Conference zone 118 of the SococoHQ virtual area 200 as a result of a telephone connection between Linda's network node 519 and the East Conference zone 118. In some examples, this telephony connection is made through a VOIP gateway server includes a VOIP gateway server process for communicating with the area server 40, a respective VOIP gateway client process for each of the client network nodes in a virtual area, and an interprocess pipe through which the gateway server process communicates with the gateway client processes. Examples of such a VOIP gateway server are described in U.S. patent application Ser. No. 13/165,729, filed Jun. 2, 2011.

Figure 19B:
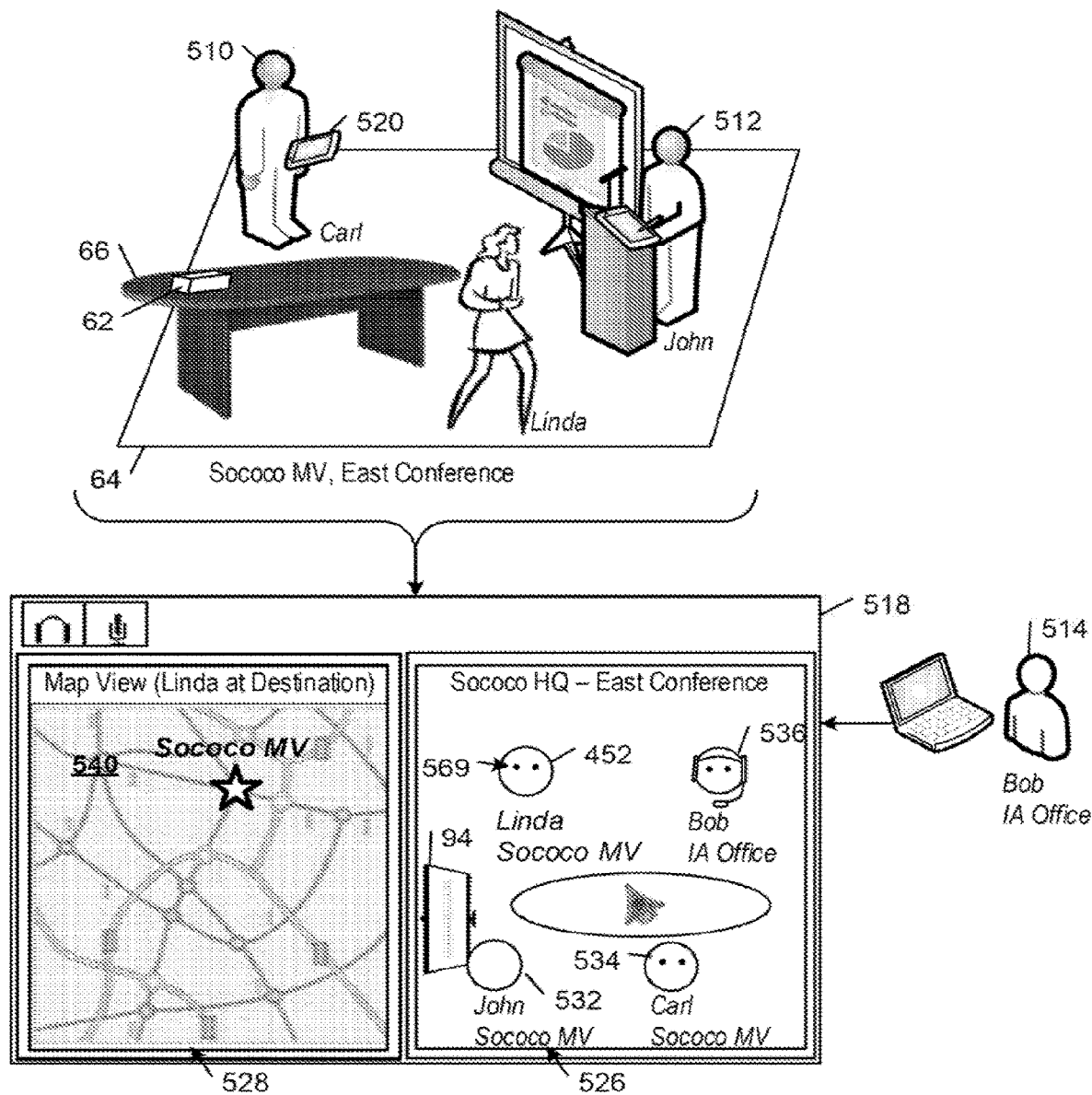
FIG. 19B is a diagrammatic view of an example of a physical area and an example of a graphical user interface.

Referring to FIG. 19B, when Linda arrives at the real world counterpart to the East Conference zone 118 (as indicated in the Map View 540 shown in the second viewer panel 528), the virtual area platform 18 seamlessly transitions the realtime communications between Linda and the other communicants in the East Conference zone 118 from the telephone connection through the VOIP gateway server to a connection through the virtual presence apparatus 62. In this process, the virtual area platform 18 establishes a presence for the user through the virtual presence apparatus 62 and terminates the connection between Linda's network node 519 and the VOIP gateway server. In this way, the virtual area platform 18 switches the communication connections between the network nodes of Linda and the other communicants in the East Conference zone 118 while maintaining the presences of Linda and the other communicants in the East Conference zone 118.

After the transition from the telephony connection to the connection through the virtual presence apparatus 62, the depiction of user's avatar in the spatial visualization shown in the first viewer panel 526 includes visual cues indicating the physical state of the user as detected by the virtual presence apparatus 62 instead of the visual cue 567 indicating that the user is connected to the East Conference zone 118 over a telephony connection. In the illustrated example, the virtual presence apparatus 62 monitors various aspects of the physical state of the user, including whether or not the user is viewing the real world viewscreen in the physical space. In response to a determination that the user is viewing the real world viewscreen, the user's avatar is depicted with a pair of eyes 569 indicating that the user is viewing the real world viewscreen corresponding to the virtual viewscreen object 94.

Figure 19C:
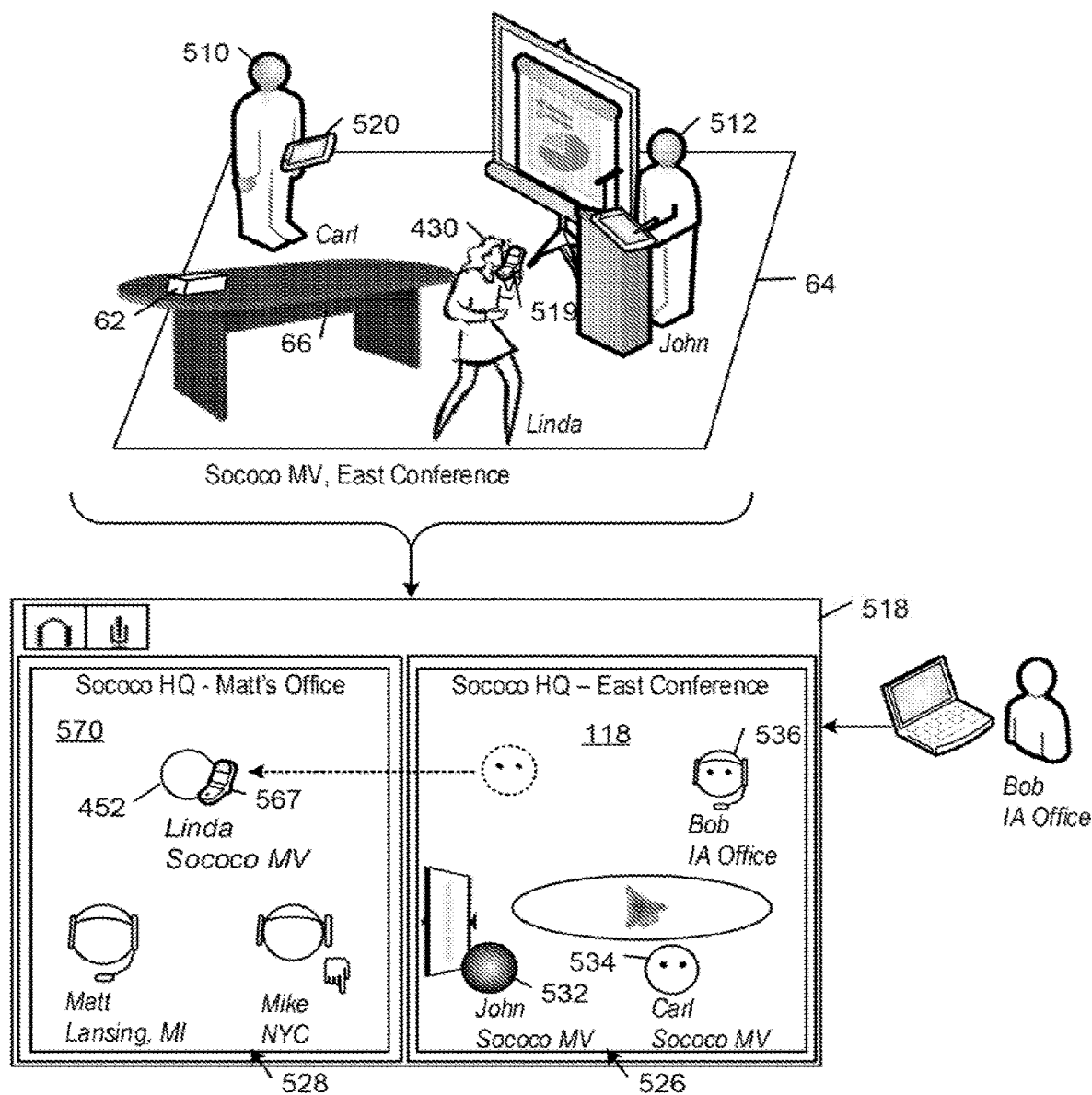
FIG. 19C is a diagrammatic view of an example of a physical area and an example of a graphical user interface.

Referring to FIG. 19C, while Linda is in the real world East Conference room 64, she is able to dial the telephone number associated with another zone of the SococoHQ virtual area 200. In the illustrated example, Linda has dialed the telephone number associated with Matt's Office zone 570 of the SococoHQ virtual area 200. In response, the virtual area platform 18 has moved Linda's virtual presence from the East Conference zone 118 to Matt's Office zone 570. In this process, the virtual area platform 18 terminates Linda's virtual presence in the East Conference zone 118, and establishes Linda's virtual presence in Matt's Office zone 570. As a result of the change in her virtual presence location, Linda is no longer virtually co-present with Carl, John, and Bob in the East Conference zone 118, and instead now is virtually co-presence with Matt and Mike in Matt's Office zone 570. In addition, the virtual area platform 18 switches the communication connections of Linda's network node 519 from the communication connections with the other communicants in the East Conference zone 118 through the virtual presence apparatus 62 to communication connections with the other communicants in Matt's Office zone 570 through Linda's network node 519.

Linda's change in virtual presence location is reflected in the graphical user interface 516 by removing Linda's avatar 452 from the visualization of the East Conference zone 118 presented in the first viewer panel 526, and depicting her avatar 452 decorated with a graphical representation of a telephone 567 in the visualization of Matt's Office zone presented in the second viewer panel 528. In other examples, the virtual area platform 18 maintains Linda's virtual presence in both the East Conference zone 118 and Matt's Office zone 570.

In some examples, the virtual area enabled communications applications operating on the network nodes of Carl, John, and Bob will display in the graphical user interface 516 respective people panels that include respective co-presence capsules showing the virtual co-presence of Linda with Matt and Mike and the physical co-presence of Linda with Carl and John (see, e.g., the co-presence capsules 236, 250 shown in FIG. 5). Analogously, the virtual area enabled communications applications operating on the network nodes of Matt and Mike will display in the graphical user interface 516 respective people panels that include respective co-presence capsules showing the virtual co-presence of Linda with Matt and Mike and the physical co-presence of Linda with Carl and John.

III. Conclusion

Other embodiments are within the scope of the claims.

The invention claimed is:

1. A system comprising:
one or more processors included in one or more computers; and
a memory, coupled to the one or more processors, storing code that when executed by the one or more processors causes the one or more computers to perform operations comprising:
tracking a current real-world location of a user in a physical place comprising real-world geographic regions each of which is associated with a virtual interactive customer service;
based on a determination that the current real-world location of the user is in a respective one of the real-world geographic regions of the physical place, establishing a presence for the user in a customer service virtual area and automatically notifying a customer service representative who is available, to join the user in the customer service virtual area, wherein (A) the customer service virtual area (i) represents a physical room, and (ii) includes definitions of geometry that represent at least a geographic perimeter of the physical room of the customer service virtual area, and (B) the user is not actually located in the physical room represented by the virtual area;
to a network node associated with the user, transmitting data representing the tracked current real-world location of the user in the physical place, wherein the data when received and processed by the network node causes the network node to display a first representation of the user on the network node in a map view concurrently with a view of the customer service virtual area, wherein the view of the customer service virtual area (i) is distinct from the map view, (ii) displays a virtual environment that includes a displayed second representation of the user in the virtual area, (iii) is associated with real time communications between the established presence of the user and the customer service representative in the customer service virtual area, and (iv) displays a real world location of the user while the user is in the customer service virtual area; and
based on a determination that the user and the customer service representative are copresent in the customer service virtual area, administering a network connection supporting realtime communications between a network node associated with the customer service representative and the network node associated with the user to enable the user and the customer service representative to communicate with each other in the customer service virtual area and the customer service representative to guide the user to a particular physical location using the tracked current real-world location of the user.

2. The system of claim 1, wherein execution of the code by the one or more processors causes the one or more computers to perform further operations comprising:
providing access to a self-help resource that provides information to resolve an issue relating to the physical place; and the administering comprises administering a network connection between the self-help resource and the network node associated with the user.

3. The system of claim 2, wherein the self-help resource is a network-based source of information relating to products associated with the physical place.

4. The system of claim 3, wherein the self-help resource provides information enabling the user to perform tasks comprising one or more of identifying products, checking product availability, comparing different products, submitting queries to and receiving query responses from a knowledgebase, reading user guides, and reading FAQs.

5. The system of claim 2, wherein execution of the code by the one or more processors causes the one or more computers to perform further operations comprising:
depicting the self-help resource in the virtual area view on a viewscreen object.

6. The system of claim 1, wherein execution of the code by the one or more processors causes the one or more computers to perform further operations comprising:
maintaining and managing lists of issues; and
issuing the user a new ticket that tracks a particular issue and schedule support for the particular issue.

7. The system of claim 6, wherein execution of the code by the one or more processors causes the one or more computers to perform further operations comprising:
responsive to issuance of the new ticket, automatically sending a notification of the particular issue to the customer service representative.

8. The system of claim 1, wherein the customer service representative is a communicant.

9. The system of claim 1, wherein execution of the code by the one or more processors causes the one or more computers to perform further operations comprising:
based on the user's current location in the respective real-world geographic region, automatically sending to the customer service representative a notification to join the user in the customer service virtual area.

10. The system of claim 1, wherein the notifying comprises notifying the customer service representative that the user is present in the customer service virtual area.

11. The system of claim 1, wherein execution of the code by the one or more processors causes the one or more computers to perform further operations comprising:
depicting in the customer service virtual area a respective object that is associated with a respective link that references a respective network resource providing information relating to contents of the respective real-world geographic region of the physical place.

12. The system of claim 1, wherein execution of the code by the one or more processors causes the one or more computers to perform further operations comprising:
associating one or more customer service representatives with respective ones of the real-world geographic regions of the physical place.

13. The system of claim 12, wherein execution of the code by the one or more processors causes the one or more computers to perform further operations comprising:
responsive to movement of the user into a particular one of the real-world geographic regions of the physical place, automatically notifying a respective one of the customer service representatives associated with the particular real-world geographic region to join the user in the customer service virtual area.

14. The system of claim 1, wherein execution of the code by the one or more processors causes the one or more computers to perform further operations comprising:
based on the tracked current real-world location of the user in a respective one of the real-world geographic regions of the physical place, automatically moving the presence of the user to the respective customer service virtual area that is associated with the real-world geographic region in which the user currently is located.

15. The system of claim 1, wherein execution of the code by the one or more processors causes the one or more computers to perform further operations comprising:
displaying, to the network node associated with the user, transmitting a map view depicting the tracked current real-world location of the user in relation to the real-world geographic regions of the physical place.

16. The system of claim 15, wherein execution of the code by the one or more processors causes the one or more computers to perform further operations comprising:
depicting on the network node in the map view aisles and rows between shelves arranged in a layout, wherein the real-world geographic regions correspond to respective shelf locations between intersections of respective ones of the aisles and rows.

17. The system of claim 1, wherein execution of the code by the one or more processors causes the one or more computers to perform further operations comprising:
responsive to a request received from the network node of the user to locate a particular item in the physical place, transmitting to the network node of the user instructions for displaying an indicator in the map view that shows where the particular item is located in relation to the real-world geographic regions of the physical place.

18. The system of claim 1, wherein:
the transmitting comprises transmitting instructions, and
the instructions when received and processed by the network node cause the network node to concurrently display on the network node of the user the map view and the customer service virtual area view in a graphical user interface.

* * * * *